(12) United States Patent
Maguire et al.

(10) Patent No.: US 11,047,716 B2
(45) Date of Patent: Jun. 29, 2021

(54) ROTATING BASE AND FLANGE ASSEMBLY FOR A FLUID SENSOR ASSEMBLY

(71) Applicant: Scully Signal Company, Wilmington, MA (US)

(72) Inventors: Daniel Maguire, Burlington, MA (US); Daniel Airey, Woburn, MA (US)

(73) Assignee: Scully Signal Company, Wilmington, MA (US)

( * ) Notice: Subject to any disclaimer, the term of this patent is extended or adjusted under 35 U.S.C. 154(b) by 0 days.

(21) Appl. No.: 16/583,910

(22) Filed: Sep. 26, 2019

(65) Prior Publication Data

US 2021/0096006 A1 Apr. 1, 2021

(51) Int. Cl.
*G01D 11/30* (2006.01)
*G01F 23/00* (2006.01)
*B65D 90/48* (2006.01)

(52) U.S. Cl.
CPC ............ *G01D 11/30* (2013.01); *B65D 90/48* (2013.01); *G01F 23/0007* (2013.01)

(58) Field of Classification Search
CPC .................... G01D 11/30; G01F 23/0007
See application file for complete search history.

(56) References Cited

U.S. PATENT DOCUMENTS

| 4,347,744 A * | 9/1982 | Buchanan | G01L 7/082 137/68.27 |
|---|---|---|---|
| 6,523,404 B1 | 2/2003 | Murphy et al. | |
| 8,593,290 B2 | 11/2013 | Hunter et al. | |
| 2004/0025588 A1* | 2/2004 | Schroth | G01F 23/268 73/304 C |
| 2008/0257253 A1* | 10/2008 | Kao | G01D 11/245 116/288 |

OTHER PUBLICATIONS

Monarch Instrument, Instruction Manual Track-It Pressure Logger with Display and Current Transmitter, 2016. (Year: 2016).*

* cited by examiner

*Primary Examiner* — Paul M. West
(74) *Attorney, Agent, or Firm* — Finch & Maloney PLLC

(57) ABSTRACT

A fluid sensor assembly is provided. The fluid sensor assembly includes a flange, a base, and a cap. The flange is configured to mount to a fluid container. The base is configured to receive a fluid sensor, the base rotatably mounted to the flange and configured to rotate about the flange, the base forming a plurality of receiving apertures positioned about a perimeter of the base. The cap is configured to lock on the base and form a fluid-tight seal between the cap and the base.

20 Claims, 18 Drawing Sheets

ROTATING BASE AND FLANGE ASSEMBLY FOR A FLUID SENSOR ASSEMBLY

FIELD OF THE DISCLOSURE

The present disclosure relates to fluid sensor probes and more particularly to improved holder assemblies for fluid sensor probes for monitoring fluid stored in physically proximal storage containers.

BACKGROUND

Tanker trailers are towed by trucks and store fluids (e.g., gasoline) in multiple compartments that are generally filled from the bottom. For safety reasons, overfill sensors or probes are placed in each compartment to detect potential overfills and provide a signal indicative of the fluid level in a given compartment. The signals provided by the overfill sensors are monitored by a separate monitoring device to identify imminent overfills and to prevent their occurrence by, for example, shutting off a fluid filling system.

The overfill sensors are wired to the monitoring device by a backbone cable loom. A conventional backbone cable loom 100 is illustrated in FIG. 1. The backbone cable loom 100 includes a monitor connection 102, main cables 106, overmolded junctions 108, sensor cables 110, and sensor connections 104. The monitor connection 102 couples the monitoring device to overfill sensors via the main cables 106, the overmolded junction 108, the sensor cables 110, and the sensor connections 104. For example, the monitor connection 102 can include one or more stripped wires configured to be terminated at the monitoring device and wired to one or more input terminals or wires at the monitoring device. The overmolded junctions 108 each contain a unique set of wire junctions that make connections between the main cables 106 and each sensor cable 110 for each particular sensor connection 104. The particular configuration of the wire junctions in an overmolded junction 108 varies based on, for example, the type of overfill sensor being used and the location of the overfill sensor in the tanker trailer (e.g., compartment #1 as opposed to compartment #3). These wire junctions are overmolded to protect the wire junctions from the external environment. The length of any of the main cables 106 and sensor cables 110 in the backbone cable loom 100 varies significantly with the particular size of the tanker trailer, the number of compartments in the tanker trailer, and the shape of the tanker trailer.

To operably connect the individual fluid sensors, the sensor connections 104 are connected to a fluid sensor assembly mounted on a portion of a fluid compartment. For examples, each sensor connection 104 can include one or more stripped wires configured to be terminated within a sensor holder housing and wired to one or more input terminals or wires of the fluid sensor assembly. The fluid sensor assembles are configured such that a fluid sensor contained within the fluid sensor assembly is positioned to detect a fluid level of the fluid compartment. However, access to a fluid compartment is typically provided via a manhole lid, or "man-lid," in the compartment. An individual man-lid is limited in size (e.g., 12-18 inches in diameter), and can include multiple components such as additional sensors, compartment access hatches or visual inspection points, gauges, and other similar components.

SUMMARY

In an example, a fluid sensor assembly is provided. The fluid sensor assembly includes a flange, a base, and a cap. The flange is configured to mount to a fluid container. The base is configured to receive a fluid sensor, the base rotatably mounted to the flange and configured to rotate about the flange, the base forming a plurality of receiving apertures positioned about a perimeter of the base. The cap is configured to lock on the base and form a fluid-tight seal between the cap and the base.

Implementations of the fluid sensor assembly can include one or more of the following features.

In some examples, the fluid sensor assembly can further include a swivel seal positioned between the base and the flange when the base is mounted to the flange, the swivel seal configured to form a fluid seal between the base and the flange during rotation of the base about the flange.

In some examples, the fluid sensor assembly can further include a retaining ring configured to rotatably lock the base to the flange.

In some examples, the fluid sensor assembly can further include a locking mechanism configured to prevent rotation of the base about the flange.

In the fluid sensor assembly, the cap can further include one or more toolless wire connectors configured to provide an electrical connection to the fluid sensor.

In the fluid sensor assembly, the cap can include a plurality of articulating levers configured to rotate about a central axis, each of the articulating levers including a latching feature configured to be inserted into one of the plurality of receiving apertures when the cap is fitted on the base and to lock the cap to the base upon rotation of the articulating levers. In some examples of the fluid sensor assembly, each of the plurality of receiving apertures can include a slot. In some examples of the fluid sensor assembly, each of the latching features can include a pin extending from opposites sides of the articulating lever, the pin sized to fit into the slot when the cap is fitted to the base and to lock into the slot upon rotation of the articulating levers.

In the fluid sensor assembly, the base can be configured to rotate 360 degrees about the flange.

In the fluid sensor assembly, the fluid sensor can be a fluid overfill sensor.

In another example, a base assembly for use in a fluid sensor assembly is provided. The base assembly can include a flange, a base, a swivel seal, and a retaining ring. The flange is configured to mount to a fluid container. The base is configured to receive a fluid sensor, the base rotatably mounted to the flange and configured to rotate about the flange, the base forming a plurality of receiving apertures positioned about a perimeter of the base. The swivel seal is positioned between the base and the flange when the base is mounted to the flange, the swivel seal being configured to form a fluid seal between the base and the flange during rotation of the base about the flange. The retaining ring is configured to rotatably lock the base to the flange.

Implementations of the base assembly for use in a fluid sensor assembly can include one or more of the following features.

In some examples, the base assembly can further include a locking mechanism configured to prevent rotation of the base about the flange. In some examples of the base assembly, wherein the locking mechanism can include a toolless locking mechanism and/or a tooled locking mechanism.

In the base assembly, the base can be configured to rotate 360 degrees about the flange.

In the base assembly, the fluid sensor can be a fluid overfill sensor.

In another example, a fluid sensor assembly is provided. The fluid sensor assembly includes a flange, a base, a swivel seal, a retaining ring, and a cap. The flange is configured to mount to a fluid container. The base is configured to receive a fluid sensor, the base being rotatably mounted to the flange and configured to rotate about the flange, the base forming a plurality of receiving apertures positioned about a perimeter of the base. The swivel seal is positioned between the base and the flange when the base is mounted to the flange, the swivel seal being configured to form a fluid seal between the base and the flange during rotation of the base about the flange. The retaining ring is configured to rotatably lock the base to the flange. The cap is configured to lock on the base and form a fluid-tight seal between the cap and the base.

Implementations of the fluid sensor assembly can include one or more of the following features.

In some examples, the fluid sensor assembly further includes a locking mechanism configured to prevent rotation of the base about the flange.

In the fluid sensor assembly, the cap can further include one or more toolless wire connectors configured to provide an electrical connection to the fluid sensor.

In the fluid sensor assembly, the base can be configured to rotate 360 degrees about the flange.

In the fluid sensor assembly, the fluid sensor can be a fluid overfill sensor.

BRIEF DESCRIPTION OF THE DRAWINGS

Various aspects of at least one example are discussed below with reference to the accompanying figures, which are not intended to be drawn to scale. The figures are included to provide an illustration and a further understanding of the various aspects and examples and are incorporated in and constitute a part of this specification but are not intended to limit the scope of the disclosure. The drawings, together with the remainder of the specification, serve to explain principles and operations of the described and claimed aspects and examples. For purposes of clarity, not every component may be labeled in every figure.

DETAILED DESCRIPTION

The following examples describe sensor assemblies and associated systems for fluid sensors (e.g., fluid level probes) that are interoperable with various tanker trailer configurations and that are easy to install and maintain. For instance, some examples disclosed herein manifest an appreciation that any given tanker trailer manufacturer may produce hundreds of different tanker trailer configurations to meet the needs of their customers.

In some examples as described herein, space around a sensor assembly, when installed, may be limited or access to the sensor assembly may be reduced. In such an example, modifications to traditional sensor assembly designs as taught herein can be used. In certain implementations, a cap of the sensor assembly can be modified such that cap locking members such as pivoting levers are redesigned to articulate in multiple directions, thereby reducing the amount of space required around the sensor assembly for attachment and detachment of the cap. In some examples, the sensor assembly can be configured such that at least a portion of the sensor assembly rotates after installation, thereby providing for customizable positioning of wiring ports to better accommodate wire routing between sensor assemblies. Additionally, depending upon the intended use of the fluid container, a two-probe sensor assembly can be used as described herein.

Figure 2A:
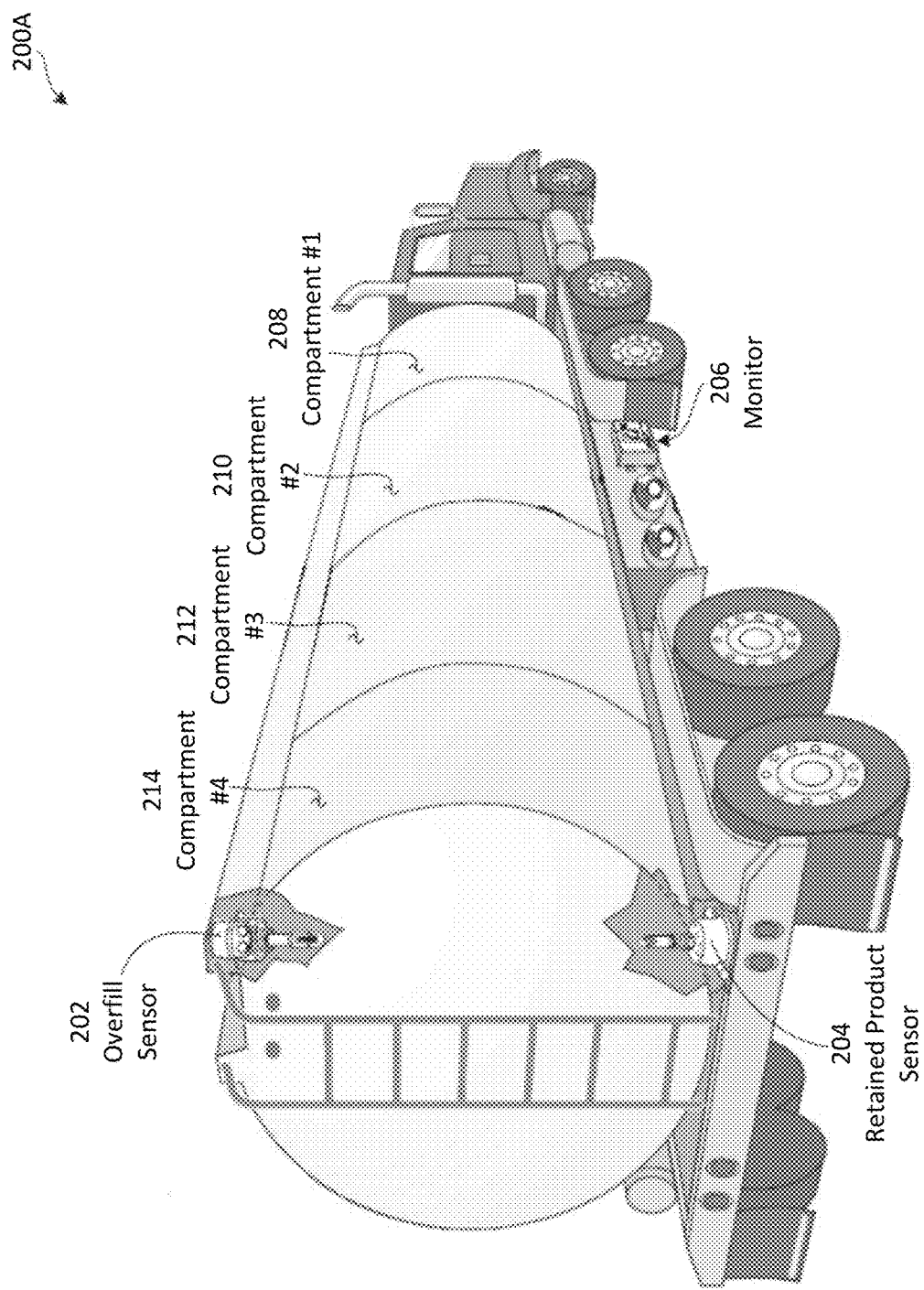
FIGS. 2A and 2B illustrate example tanker trailers, in accordance with examples of the present disclosure.
Figure 2B:
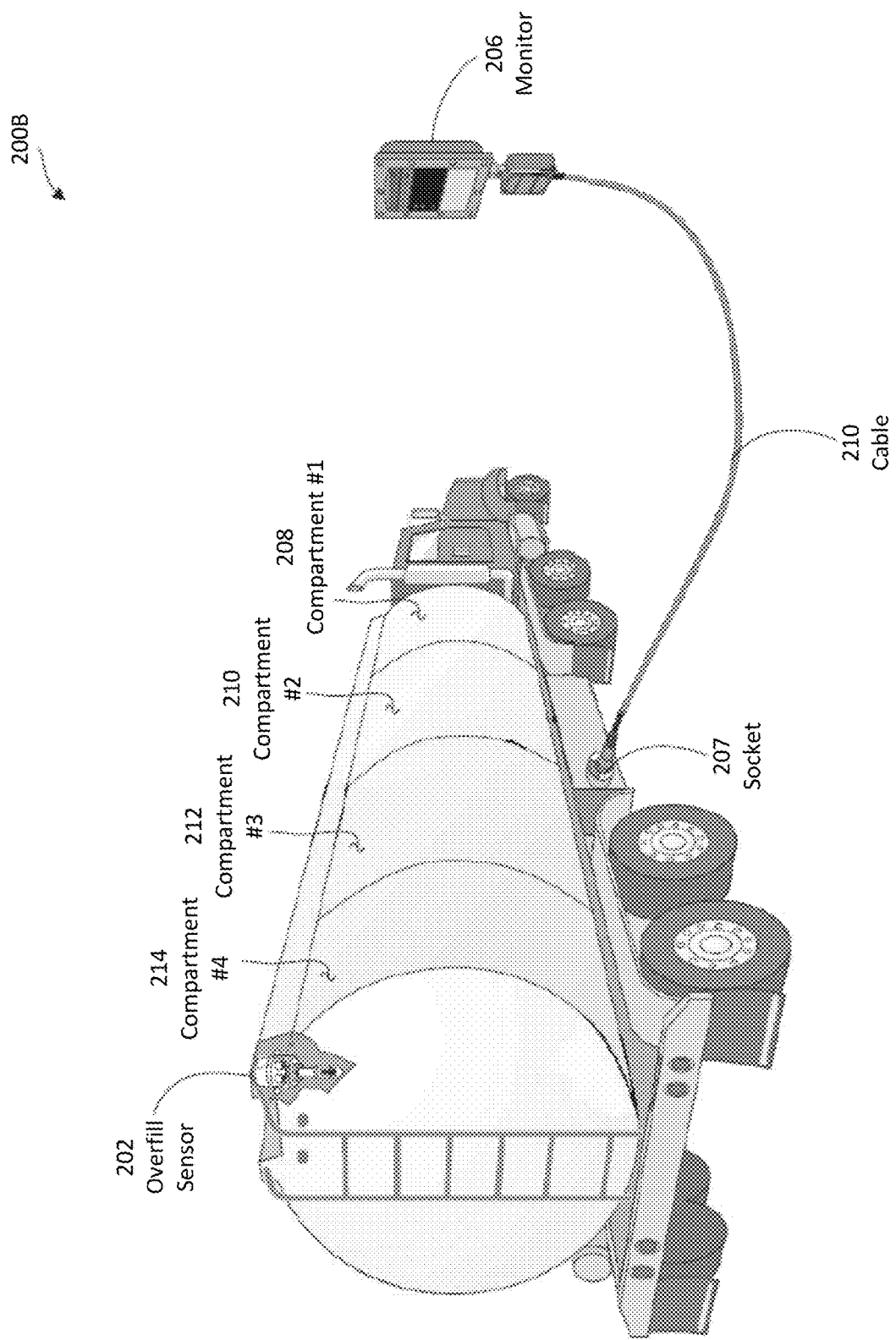

Various examples disclosed herein include wiring interfaces and associated systems for fluid sensors on tanker trailers. FIG. 2A illustrates an example tanker trailer 200A suitable for transporting fluids including, for example, gasoline and other petroleum products. As shown in FIG. 2A, the tanker trailer 200A includes an overfill sensor assembly 202, a retained product sensor assembly 204, a monitor 206, and a set of compartments 208, 210, 212, and 214. Each compartment of the set of compartments 208, 210, 212, and 214 is constructed to store fluid. Each of these compartments 208, 210, 212, and 214 can include an overfill sensor assembly, such as the overfill sensor assembly 202, and a retained product sensor assembly, such as the retained product sensor assembly 204. The overfill sensor assembly 202 provides a signal indicative of whether a compartment is filled with fluid, and the retained product sensor assembly 204 provides a signal indicative of whether the compartment is empty. The overfill sensor assembly 202 and/or the retained product sensor assembly 204 can be in communication with the monitor 206 (e.g., via electrical wires). The monitor 206 processes the signals received from the overfill sensor assemblies and/or the signals received from the retained product sensor assemblies to variously detect potential compartment overfills and empty compartments. It is appreciated that other tanker trailer configurations may be employed. For example, the tanker trailer may omit retained product sensor assembly 204 and/or monitor 206 as illustrated by tanker trailer 200B in FIG. 2B. In cases where the monitor 206 is not mounted on the tanker trailer, the tanker trailer 200B includes a socket 207 that is connected to the overfill sensor assembly 202 in each of the compartments 208, 210, 212, and 214. The socket 207 is configured to connect, via the cable 210, to an off-board monitor 206 that is, for example, mounted on a loading rack.

Articulating Levers

As noted above, depending upon the design and number of components included on a tanker trailer or other similar fluid storage container, the space around a component such as a fluid sensor assembly (e.g., overfill sensor assembly 202 as described above) can be limited. For example, a single man-lid can include multiple components such as a visual inspection cover, venting components, a tank access cover, a tank temperature probe, a tank pressure probe, a fluid sensor assembly such as an overfill sensor assembly, and other similar components. In such an example, space around each individual component can be limited and access to any specific component may be restricted.

To access the sensors and fluid probes contained within the fluid sensor assembly, the cap of the sensor assembly may need to be removed. However, in order to maintain a secure connection and protect the fluid sensors and probes contained within the fluid sensor assembly, the cap may require a robust fastening system that is not easy to remove or requires space around the cap to manipulate. As noted above, the fluid sensor assembly may be positioned on a man-lid with numerous other components, further complicating access to and removal of the fluid sensor assembly cap.

As described herein, a fluid sensor assembly can include a base configured to receive a fluid sensor, the base forming a plurality of receiving apertures positioned about a perimeter of the base and a cap configured to fit on the base and form a fluid-tight seal between the cap and the base. The cap can include a plurality of articulating levers that are each configured to rotate about a corresponding, respective central axis. Each of the articulating levers can have a latching feature configured to be inserted into one of the plurality of receiving apertures when the cap is fitted on the base and to lock the cap to the base upon rotation of the articulating levers. Thus, as described herein, by including articulating levers that rotate to lock the cap to the base, the amount of space around the fluid sensor assembly that is required for locking/unlocking and removing the cap is reduced. Such a fluid sensor assembly with a cap having articulating levers is described in greater detail in the following description of FIGS. 3-6.

Figure 3A:
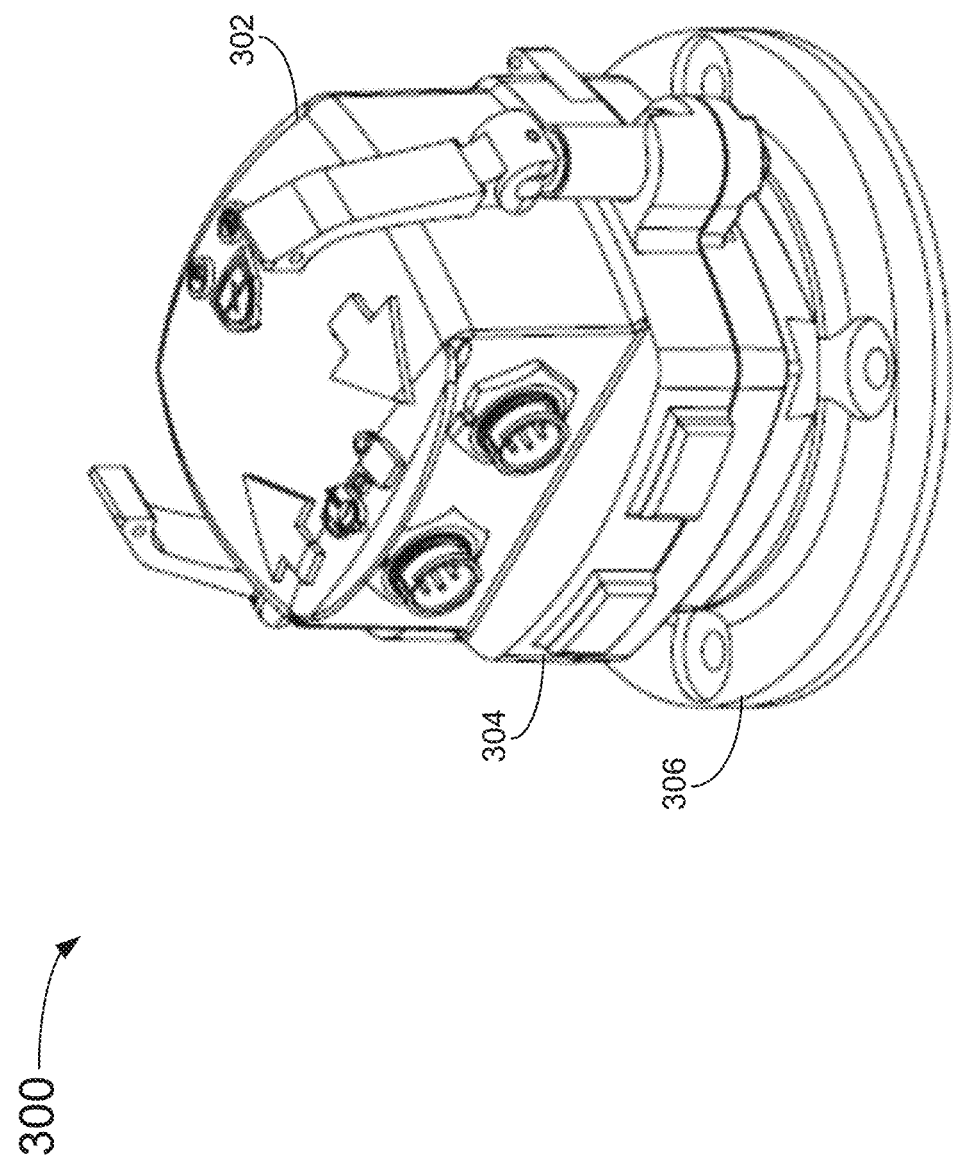
FIGS. 3A and 3B illustrate an example fluid sensor assembly, in accordance with examples of the present disclosure.

FIG. 3A illustrates a fluid sensor assembly 300 configured to house a fluid sensor such as a fluid overfill sensor as described above. The sensor assembly 300 can include a cap 302 that is configured to removably attach to a base 304. The base 304 can be mounted or otherwise attached to a flange 306. The flange 306 can be mounted to a fluid container and be positioned to surround an opening in the fluid container, thereby providing access to the interior of the fluid container. Additionally, once assembled, the cap 302, base 304, and flange 306 are configured to seal the fluid container such that any fluid and vapors from the fluid are contained as well. For example, upon assembly the fluid sensor assembly can have an ingress protection rating of IP65 as defined by international standard EN 60529. Each of cap 302, base 304, and flange 306 are described in additional detail below.

Figure 3B:
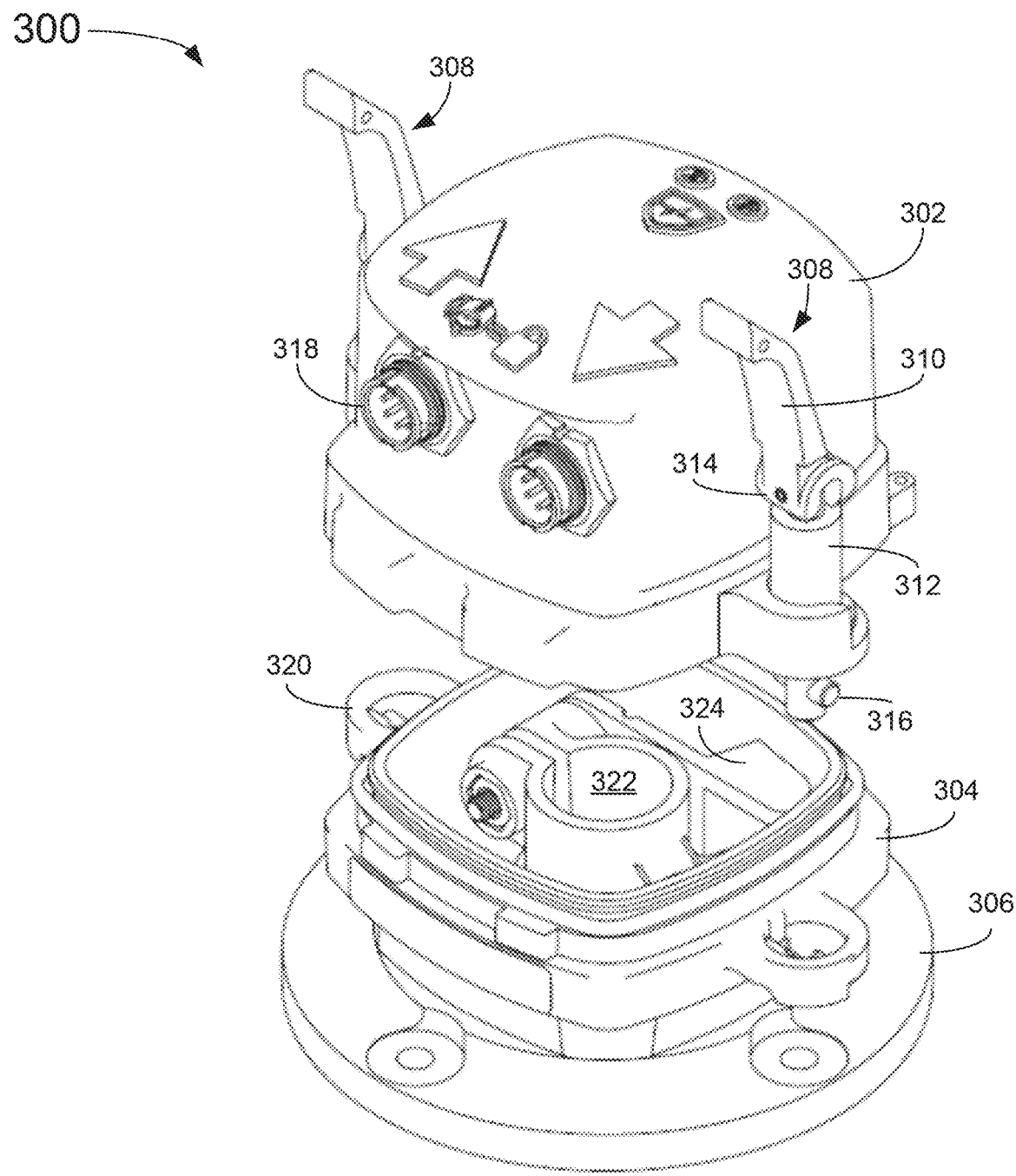

FIG. 3B illustrates an exploded view of the fluid sensor assembly 300 with cap 302 detached from the base 304. As shown in FIG. 3B, the cap 302 can include a set of articulating levers 308. It should be noted that two articulating levers 308 are shown by way of example and, depending upon the size and shape of cap 302, different numbers of articulating levers can be used.

As further shown in FIG. 3B, each of articulating levers 308 can include a top portion 310 that is configured to be manipulated by a person such as a technician accessing the fluid sensor assembly 300. In certain implementations, the top portion 310 can be sized and/or shaped to receive a finger or multiple fingers of the person accessing the fluid sensor assembly 300 to better facilitate manipulation of the articulating lever 308. As shown in FIG. 3A, the top portion 310 can be shaped such that at least a portion of the articulating lever contours to mimic at least a portion of an exterior shape of the cap 302. The contour of the top portion 310 can be seen in, for example, FIG. 5C as described below.

Referring again to FIG. 3B, each articulating lever 308 can further include a bottom portion 312. The bottom portion 312 can be coupled to the top portion 310 at a pivot point 314. For example, the pivot point 314 can include a pin that connects the top portion 310 and the bottom portion 312 such that the top portion can pivot from a vertical to a horizontal position about the pivot point. The bottom portion 312 can also include one or more latching features 316. For example, as shown in FIG. 3B, the latching feature 316 can include a pin that extends from opposite sides of the bottom portion 312. However, it should be noted that a pin is shown by way of example only and additional latching features 316 can be used. For example, the latching features 316 can include a threaded portion, a hook-shaped protrusion, an L-shaped or C-shaped protrusion, and other similar latch shapes and fasteners.

As defined herein and explained in greater detail below, during manipulation and locking of the cap 302, the articulating levers 308 can be rotated about a central axis of rotation, thereby locking the cap to the base 304. The pivot point 314 can be configured to provide a movement point for the top portion 310 relative to the bottom portion 312 such that the top portion can pivot about the pivot point to a position perpendicular to the central axis of rotation. The movement of the articulating levers 308, and the individual components of the articulating levers, is described in greater detail below in the discussion of FIGS. 5A-5C.

As further shown in FIG. 3B, the cap 302 can further include one or more wire connectors 318 that are configured to provide an external electrical connection to a fluid sensor housed within the fluid sensor assembly 300. For example, the cap 302 can include a modular connector that is configured to releasably attach to the wiring of the fluid sensor. A cable having, for example, a matching toolless connector such as a bayonet connector can be attached to the connectors 318, thereby establishing a connection to the fluid sensor housed within the fluid sensor assembly 300. Examples of such toolless connectors can be found in U.S. patent application Ser. No. 15/573,007, filed Nov. 9, 2017 and entitled "Wiring Interface for Fluid Sensors," the content of which is hereby incorporated herein by reference in its entirety.

Referring again to FIG. 3B, the base 304 can form a set of receiving apertures 320 that are positioned about the perimeter of the base and configured to receive the latching features 316 of the articulating levers 308. Similar to the articulating levers 308, two receiving apertures 320 are shown by way of example only and, depending on the size and shape of the base 304, additional numbers of receiving apertures can be included. Each of the receiving apertures 320 can be shaped to receive at least a portion of the latching features 316. For instance, if the latching feature 316 is shaped like a pin as shown in FIG. 3B, the receiving aperture 320 can be shaped like a slot configured to receive the pin. However, upon rotation of the articulating lever 308 as described herein, the latching feature 316 can rotate in the receiving aperture 320, thereby locking the cap 302 to the base 304.

As further shown in FIG. 3B, the base 304 can further include a fluid sensor mounting bracket 322 that is configured to secure, for example, a cylindrical fluid level probe. A sensor lock 324 can be included to releasably tighten the mounting bracket 322, thereby securing the fluid sensor in the fluid sensor assembly 300. It should be noted, however, that the shape of the mounting bracket 322 and the type of sensor lock 324 as shown in FIG. 3B are provided by way of example only. Depending upon the type and shape of fluid sensor used, the shape of the mounting bracket 322 can be altered to properly fit and secure the fluid sensor. Similarly, the sensor lock 324 can include a lever that is configured to pivot between a locked position and an unlocked position as shown in FIG. 3B. However, depending upon the design of the mounting bracket 322, the sensor lock 324 can include additional locking or tightening implements such as a thumb screw, a hex head screw, a Phillips head screw, a straight head screw, a square head screw, and other similar tightening implements can be used.

Figure 4:
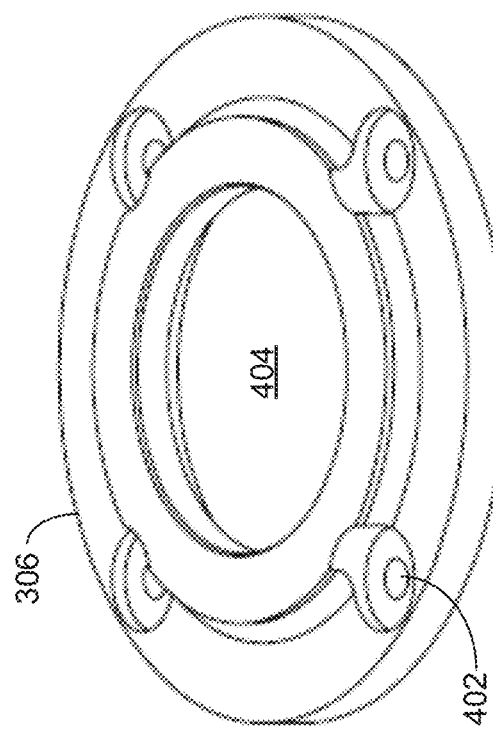
FIG. 4 illustrates a sample mounting flange, in accordance with examples of the present disclosure.
Figure 4:
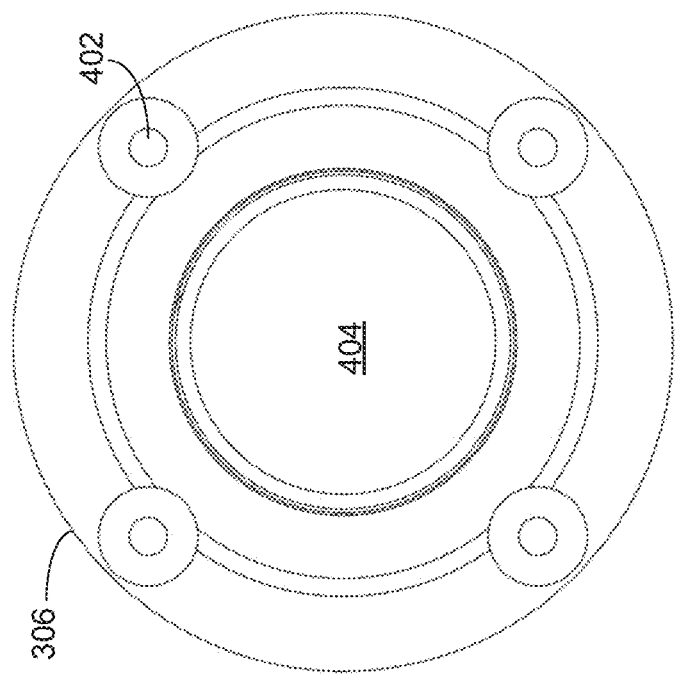

FIG. 4 illustrates multiple views of flange 306 as described above and included in FIGS. 3A and 3B. More specifically, the left image shows a top-down view of the flange 306 and the right view shows an isometric view of the flange.

As shown in FIG. 4, the flange 306 can form a set of mounting holes 402 that are positioned about the perimeter of the flange 306. Each of the mounting holes 402 can be sized to receive a particular fastener. For example, each of mounting holes 402 can be about 0.27 inches in diameter and configured to receive a 0.25-inch fastener such as a stainless-steel bolt. However, it should be noted that these sizes are provided by way of example only and can be modified depending upon the size of the flange 306.

As further shown in FIG. 4, the flange 306 can also form a central opening 404 that is configured to be positioned over and around an opening in the fluid container, thereby providing access to the interior of the fluid container. For example, the overall outer diameter of the flange 306 can be about 4.5 inches. In such an example, the central opening 404 can have a diameter of about 2.0 inches. However, it should be noted that these diameters are provided by way of example only. In some examples, the flange 306 can have an outer diameter of about 3.5 to about 6.0 inches. In such examples, the central opening 404 can have a diameter of about 1.5 to about 4.0 inches.

As noted above, the fluid sensor assembly 300 can be configured to mount on an external fuel container such as a fuel tanker trailer and, as such, can be designed to be exposed to harsh conditions such as rain, snow, wind, sun, heat, and other types of weather. In addition, the components of the fluid sensor assembly 300 can be designed to withstand potential corrosion caused by the fluid in the container as well as any fumes or vapors that the fluid gives off. For example, if the fluid is gasoline, the components of the fluid sensor assembly 300 can be manufactured from materials that can withstand exposure to gasoline. In certain implementations, the base 304 and the flange 306 can be manufactured from a non-corrosive metal such as stainless-steel or another similar metal. The cap 302 can be manufactured from a lighter material such as a high-density polyethylene or another similar plastic.

Figure 5A:
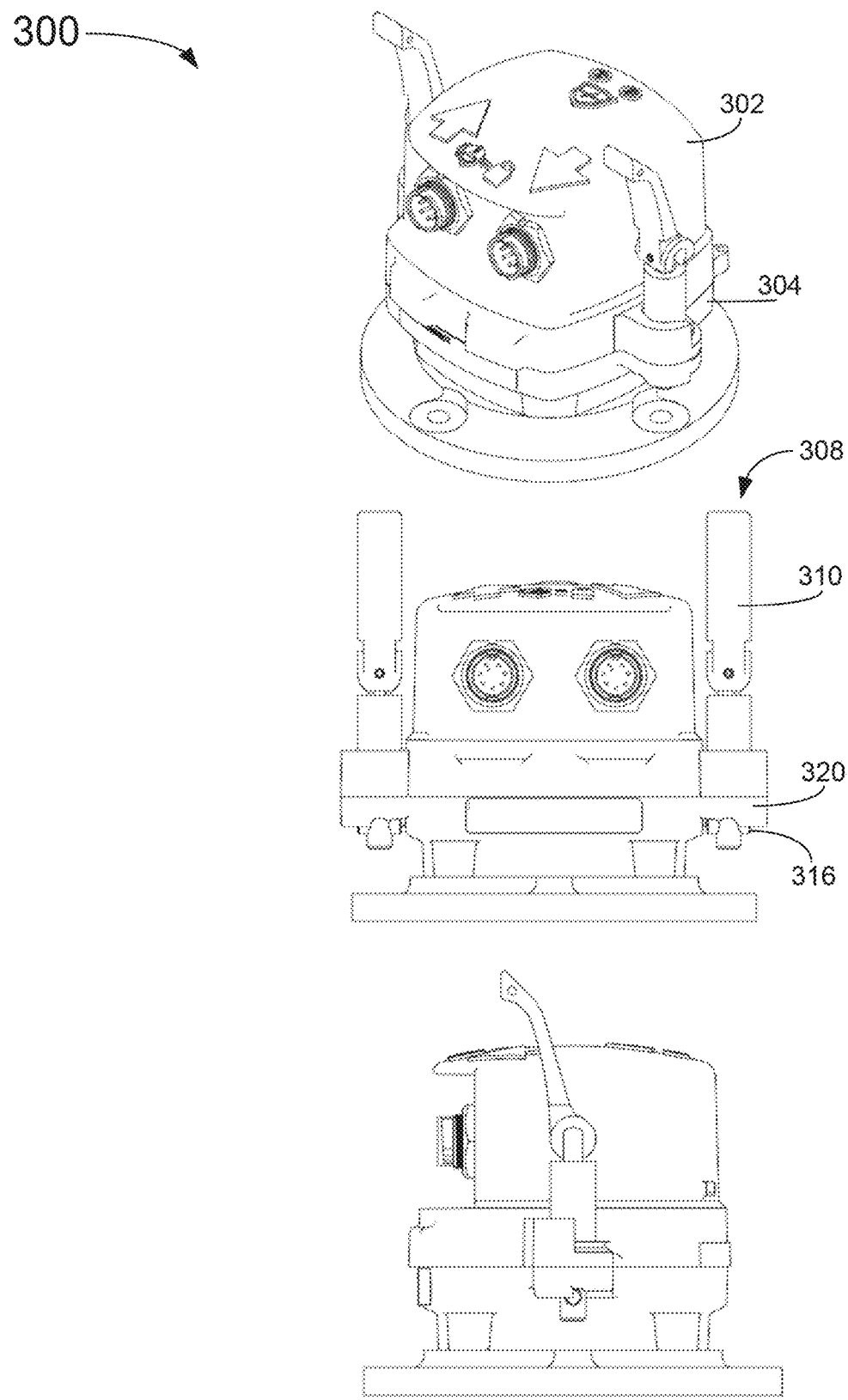
FIGS. 5A-5C illustrate a sequence of positions assumed by levers during a process of locking a cap to a base in a fluid sensor assembly, in accordance with examples of the present disclosure.
Figure 5B:
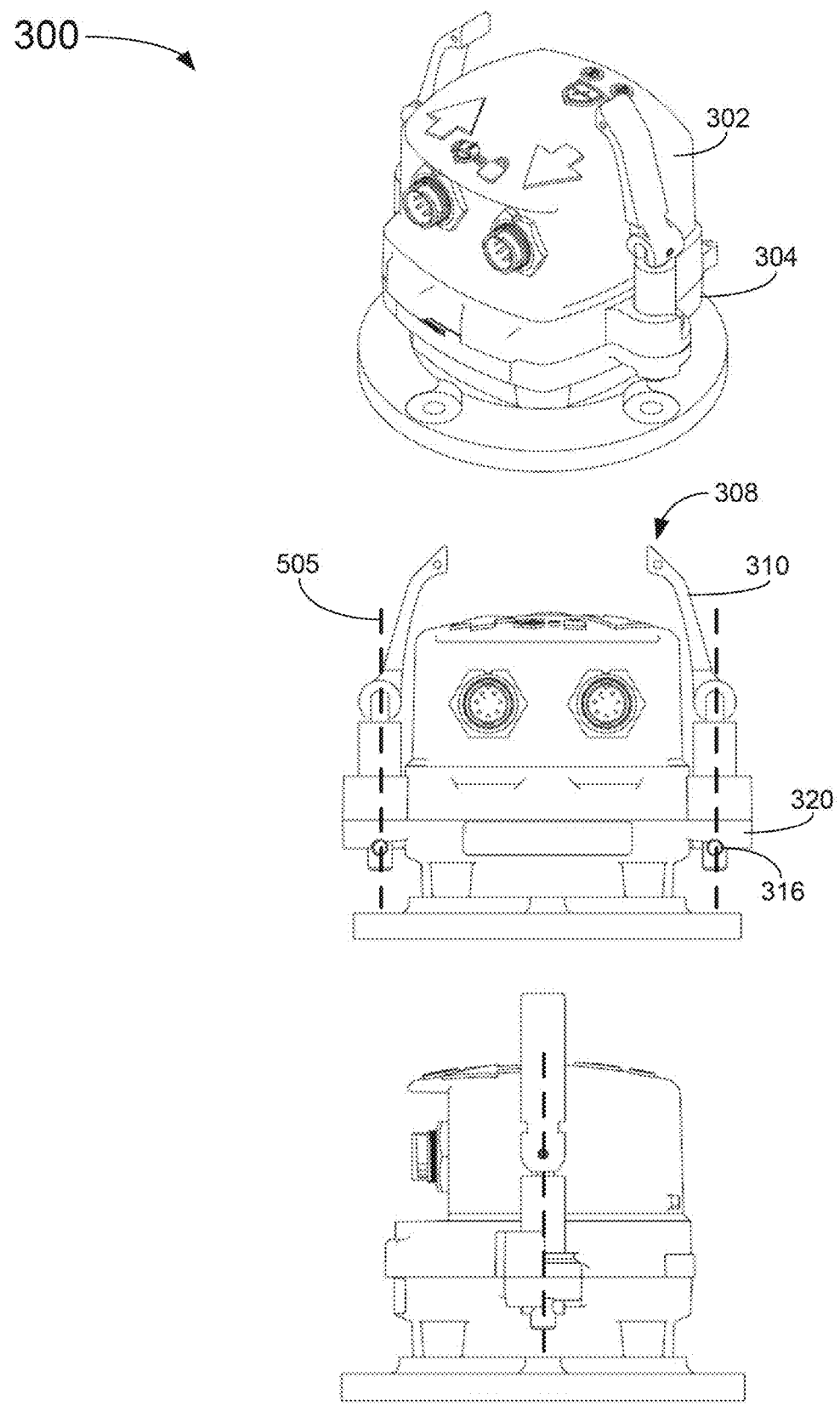
Figure 5C:
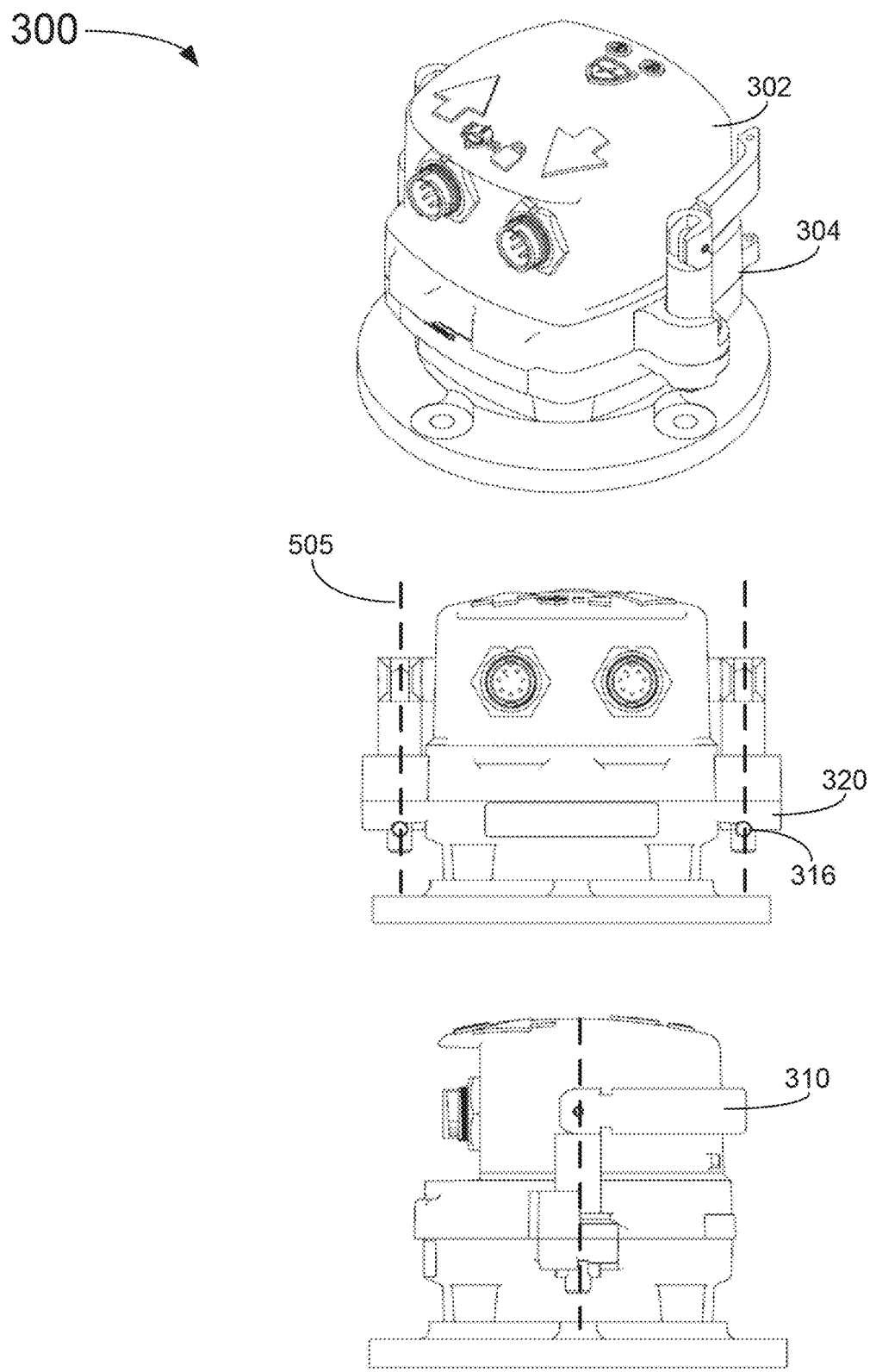

FIGS. 5A-5C illustrate a set of views (top, middle, and bottom) showing various positions of the articulating levers 308 during attachment of the cap 302 to the base 304 in one particular example. In FIGS. 5A-5C, the top view shows an isometric view, the middle view shows a front view, and the bottom view shows a side view. However, it should be noted that, in each individual figure, the components shown in the fluid sensor assembly are in the same position relative to one another. For example, the position of the articulating levers 308 are identical in each of the top, middle, and bottom views of each individual FIGS. 5A, 5B, and 5C.

As shown in FIG. 5A, the cap 302 has been positioned on the base 304 and each of the top portions 310 of the articulating levers 308 are oriented in a parallel position relative to the front side of the fluid sensor assembly 300. Each of the latching features 316, illustrated in this example as pins, is similarly oriented in a parallel position relative to the front side of the fluid sensor assembly 300. In certain implementations, each of the pins can be oriented in a different position such as in a perpendicular position relative to the front side of the fluid sensor assembly 300. Additionally, each of the latching features 316 is positioned within a receiving aperture 320. However, with this position of the articulating arms 308, the cap 302 can be lifted from the base 304 without any manipulation.

As shown in FIG. 5B, the cap 302 remains positioned on the base 304 and each of the articulating levers 308 have been rotated 90 degrees about a central axis of rotation 505. As such, each of the top portions 310 of the articulating levers 308 are oriented in a perpendicular position relative to the front side of the fluid sensor assembly 300. Each of the latching features 316, illustrated in this example as pins, are similarly oriented in a perpendicular position relative to the front side of the fluid sensor assembly 300. Additionally, each of the latching features 316 is now locked within a receiving aperture 320.

It should be noted that, in this example, each of the articulating levers 308 are configured to rotate in opposite directions (e.g., one of the articulating arms is configured to rotate in a clockwise direction and one of the articulating arms is configured to rotate in a counter-clockwise direction). However, this is shown by way of example only and, in certain implementations, the articulating levers can be configured to rotate in the same direction.

As shown in FIG. 5C, the cap 302 remains locked on the base 304. Each of the top portions 310 of the articulating levers 308 have been pivoted about pivot point 314 and are oriented toward the back of the cap 302. After pivoting, each of the top portions 310 are positioned perpendicular to the central axis of rotation 505. When positioned as shown in FIG. 5C, the chance of accidentally manipulating the articulating levers 308 is reduced or eliminated completely. Additionally, when positioned as shown in FIG. 5C, the contour of the top portions 310 can be configured to mimic the overall shape of the cap 302, thereby eliminating any component of the fluid sensor assembly 300 protruding beyond the diameter of the flange 306, resulting in a compact design that does not interfere with any adjacent components that may be mounted, for example, on the same man-lid of a tanker trailer.

To remove the cap 302 from the base 304, a reverse process as that shown in FIGS. 5A-5C can be used. For example, the top portions 310 of the articulating levers 308 can be pivoting about the pivot point 314 back into a vertical position as shown in FIG. 5B. The articulating levers 308 can then be rotated 90 degrees back to a position where the top portions 310 of the articulating levers are oriented in a parallel position to the front side of the fluid sensor assembly, thereby unlocking the latching features 316 from the receiving apertures 320. Once unlocked, the cap 302 can be removed from the body 304.

Figure 6:
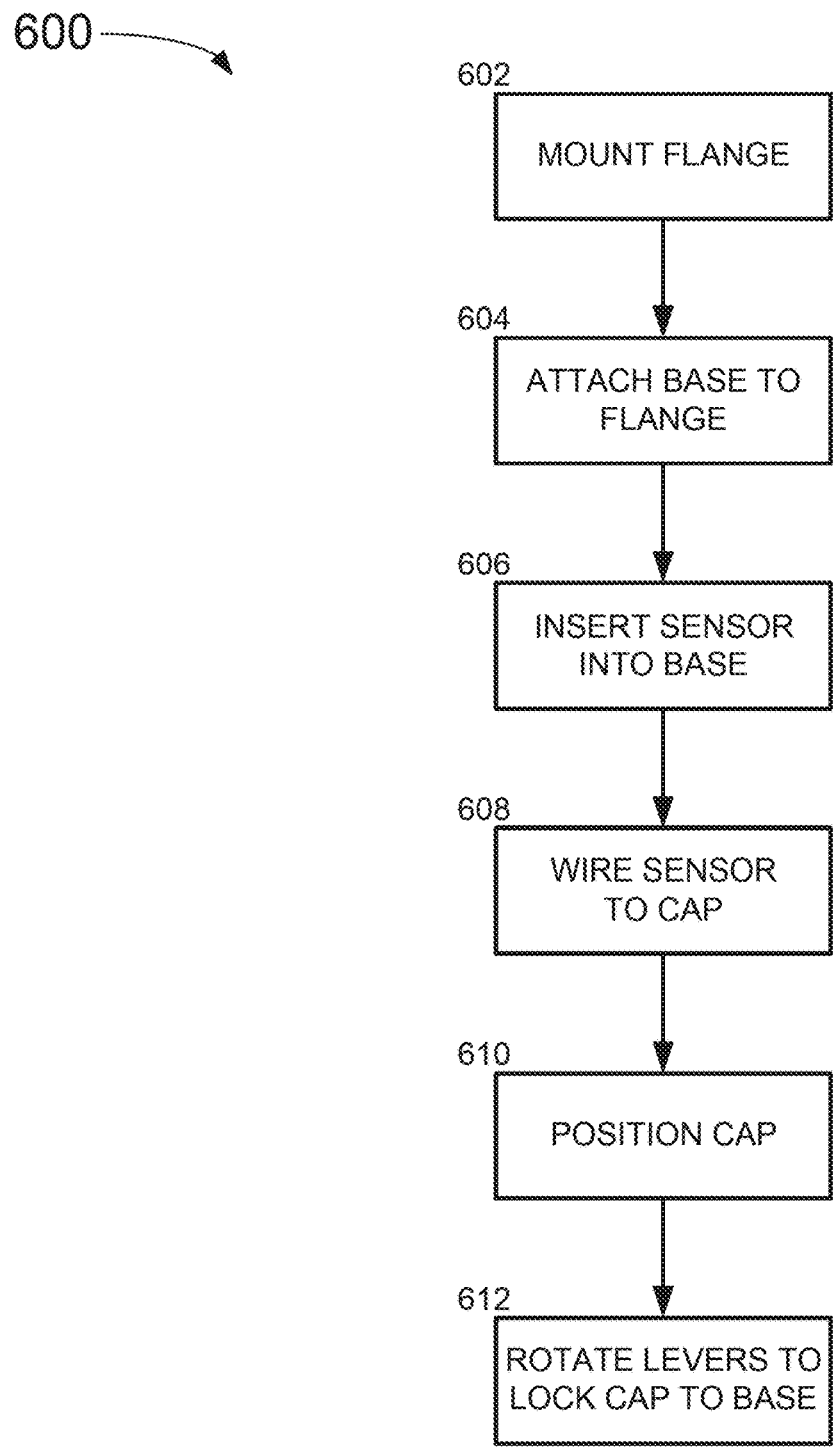
FIG. 6 illustrates a flow diagram depicting a process for mounting and assembling a fluid sensor assembly such as that illustrated in FIGS. 3A and 3B, in accordance with examples of the present disclosure.

FIG. 6 illustrates a sample process 600 for mounting and assembling a fluid sensor assembly (e.g., fluid sensor assembly 300) as described above in the discussion of FIGS. 3A-5C. The process 600 can include initially mounting 602 the flange to a fluid container such as a fluid compartment in a tanker trailer. Mounting 602 the flange can include cutting a hole into the container or simply mounting the flange around a hole already cut or otherwise inserted into the container. The base can then be attached 604 to the flange using, for example, bolts, screws, or other similar fasteners. In some examples, the base can be attached to the flange using a tension or snap fit, secured using a tensioning ring, or another similar fastening technique. In other examples, the base can include a threaded portion that is configured to screw or otherwise turn into the flange, thereby attaching the base to the flange.

Process 600 can further include inserting 606 and securing the fluid sensor or probe into the base. As noted above, the base can include a mounting bracket configured to secure the fluid sensor as well as a sensor lock for tightening the sensor into the mounting bracket. The fluid sensor can be wired 608 to the cap. As noted above, the sensor can include a modular connector configured to attach to a mating modular connector on the cap. The cap can then be positioned 610 and the articulating levers can be rotated 612 to lock the cap to the base using, for example, a similar process as that shown in FIGS. 5A-5C and described above.

It should be noted that the process 600 as shown in FIG. 6 is provided by way of example only. In actual implementation, several of the process steps can be combined and/or performed in an alternate order. Similarly, additional process steps can be included. For example, in certain implementations, the base and the flange can be manufactured as a single component. In such an example, attaching 604 the base to the flange can be performed during manufacturing of the flange/base component. In certain implementations, inserting 606 the sensor into the base can be performed prior to attaching 604 the base to the flange.

Swivel Flange

As noted above, depending upon the design and number of components included on a tanker trailer or other similar fluid storage container, the space around a component such as a fluid sensor assembly can be limited. This is especially important and potentially troublesome when running wires between fluid sensors assemblies. For example, as noted above, a single man-lid can include multiple components. In such an example, space around each individual component can be limited and pathways for routing wires to a sensor such as a fluid sensor contained within a fluid sensor assembly as described herein can be difficult to access or follow depending upon the mounting position and orientation of the fluid sensor assembly once mounted.

As described herein, a fluid sensor assembly can include a flange configured to mount to a fluid container and a base configured to receive a fluid sensor, the base rotatably mounted to the flange and configured to rotate about the flange. The base can further form a plurality of receiving apertures positioned about a perimeter of the base as described above, and the fluid sensor assembly can include a cap configured to lock on the base and form a fluid-tight seal between the cap and the base such as cap 302 described above. However, by including a base that is rotatably mounted to the flange and configured to rotate, in some examples, 360 degrees can provide added flexibility when installing a fluid sensor assembly as the base can be rotated to provide better and easier access to the connectors on the cap (e.g., toolless connectors 320 as described above). Such a rotatable base/flange assembly is described in greater detail in the following description of FIGS. 7-9.

Figure 7A:
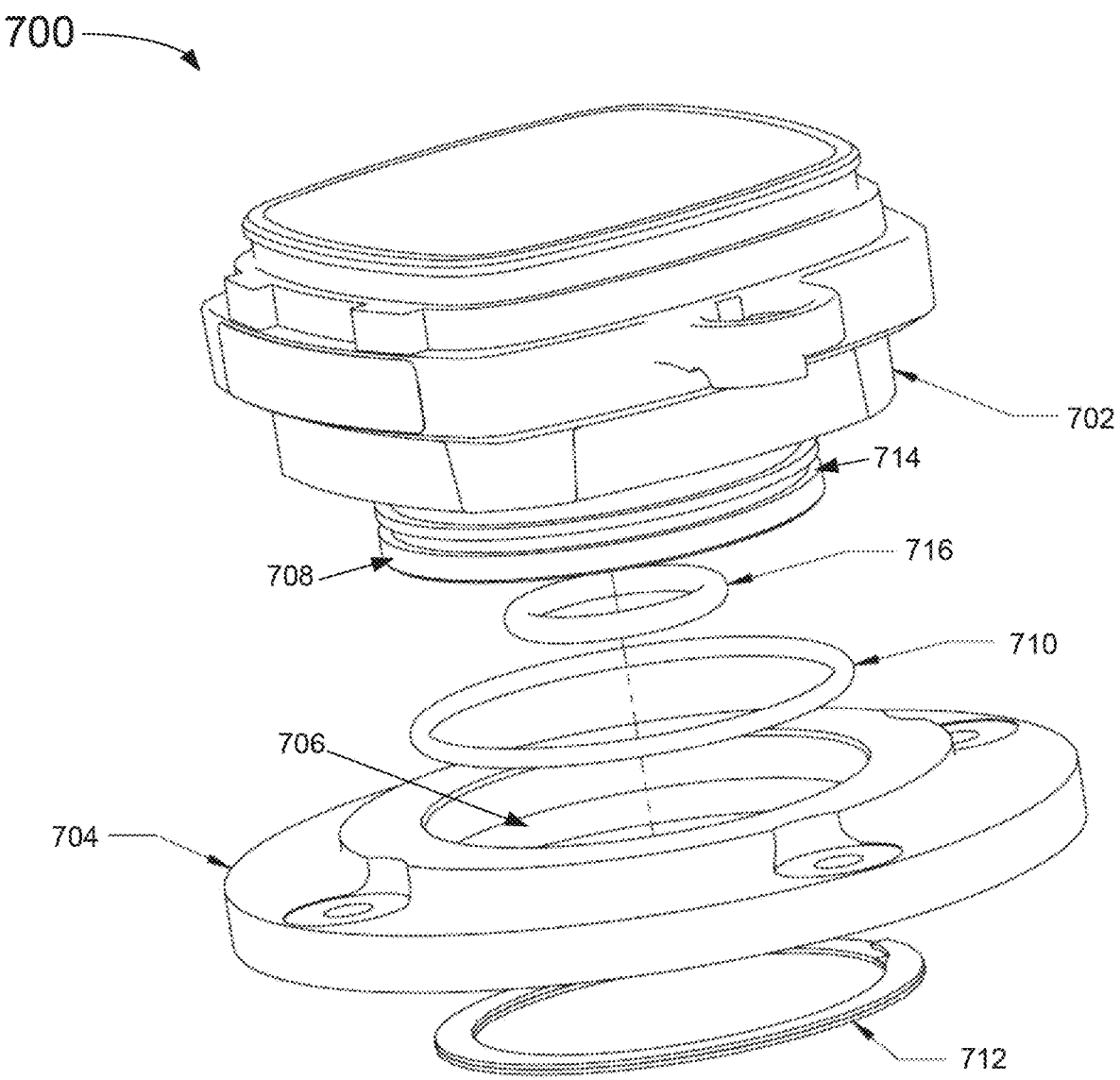
FIG. 7A illustrates an exploded view of a rotatable base/flange assembly, in accordance with examples of the present disclosure.

FIG. 7A illustrates an exploded view of a sample rotating or swiveling base/flange assembly 700 as described herein. As shown in FIG. 7A, a base 702 can be rotatably attached to a flange 704. As described herein, flange 704 can be similar to flange 306 as described above, for example, in FIG. 4. The flange 704 can form a central opening 706 that is configured to receive an extended portion or stem 708 included on base 702. A swivel seal 710 can be positioned between the stem 708 and the central opening 706 to form a fluid-tight seal between the base 702 and the flange 704 while permitting rotation of the base about the flange.

In certain implementation, the swivel seal 710 is an O-ring made from a flexible material such as fluorosilicone. Such a seal can provide a barrier against fumes, liquids, and vapors from the fluid container while permitting rotation of the base about the flange. In other implementations, the swivel seal 710 can be made from other chemically compatible materials that permit rotation of the base 702 such as polymers similar to fluorosilicone, Teflon, and other similar materials. The swivel seal 710 can also be manufactured to satisfy any requirements regulated by, for example, the U.S. Department of Transportation (DOT). For example, in a rollover situation, the U.S. DOT requires that any fluid container access points maintain a fluid seal up to a pressure of about 38 psi. As such, the swivel seal 710 can be manufactured to satisfy or exceed this requirement. For example, the swivel seal 710 can be manufactured and tested to withstand a pressure of about 80 psi in a rollover situation. In other examples, the swivel seal 710 can be manufactured to a different size/thickness or from a different material to withstand a pressure of about 60-100 psi.

Referring again to FIG. 7A, the base/flange assembly 700 can include a retaining ring 712 that is configured to fit within a receiving groove 714 on stem 708 once inserted into central opening 706, thereby locking the base 702 and the flange 704 together. The retaining ring 712 can be configured to exert a pressure on the groove 714, thereby maintaining a force on the swivel seal 710 and providing the vapor lock between the base 702 and the flange 704. The base/flange assembly 700 can further include a probe seal 716 configured to provide an effective seal around a fluid sensor or probe once inserted into the base as described above. The probe seal 716 can be manufactured from a similar material as the swivel seal 710 as described above.

In certain implementations, the retaining ring 712 can be manufactured from a corrosion-resistance material such as stainless steel. The retaining ring 712 can be sized so as to fit tightly within the groove 714 to prevent separation of the base 702 from the flange 704 during operation of the base/flange assembly 700. For example, the retaining ring 712 can fit in the groove 714 such that the retaining ring contacts the groove about the entire inner circumference of the retaining ring, thereby eliminating any movement or rotation of the retaining ring when fitted into the groove.

Figure 7B:
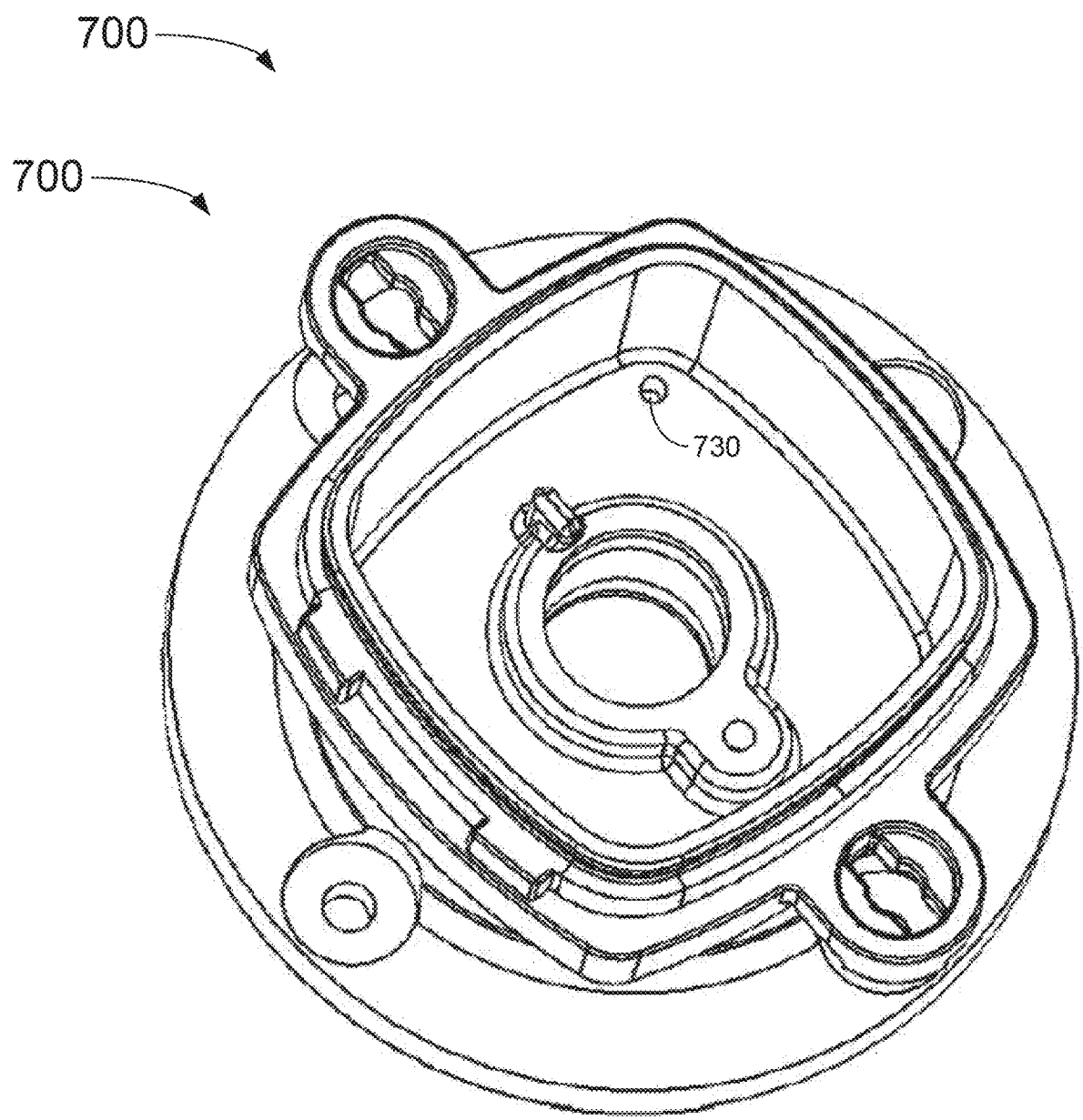
FIG. 7B illustrates a perspective view of a rotatable base/flange assembly, in accordance with examples of the present disclosure.

In certain implementations, the base/flange assembly 700 can include additional components. For example, as shown in FIG. 7B, the base/flange assembly 700 can include a locking mechanism 730. The locking mechanism 730 can be configured to provide a locking feature to prevent further rotation of the base 702 about the flange 704. In certain implementations, the locking mechanism 730 can include a toolless locking mechanism such as a thumb screw or a butterfly/wing nut. In other implementations, the locking mechanism 730 can include a tooled locking mechanism such as a screw that requires a driver for tightening or bolt.

Figure 8:
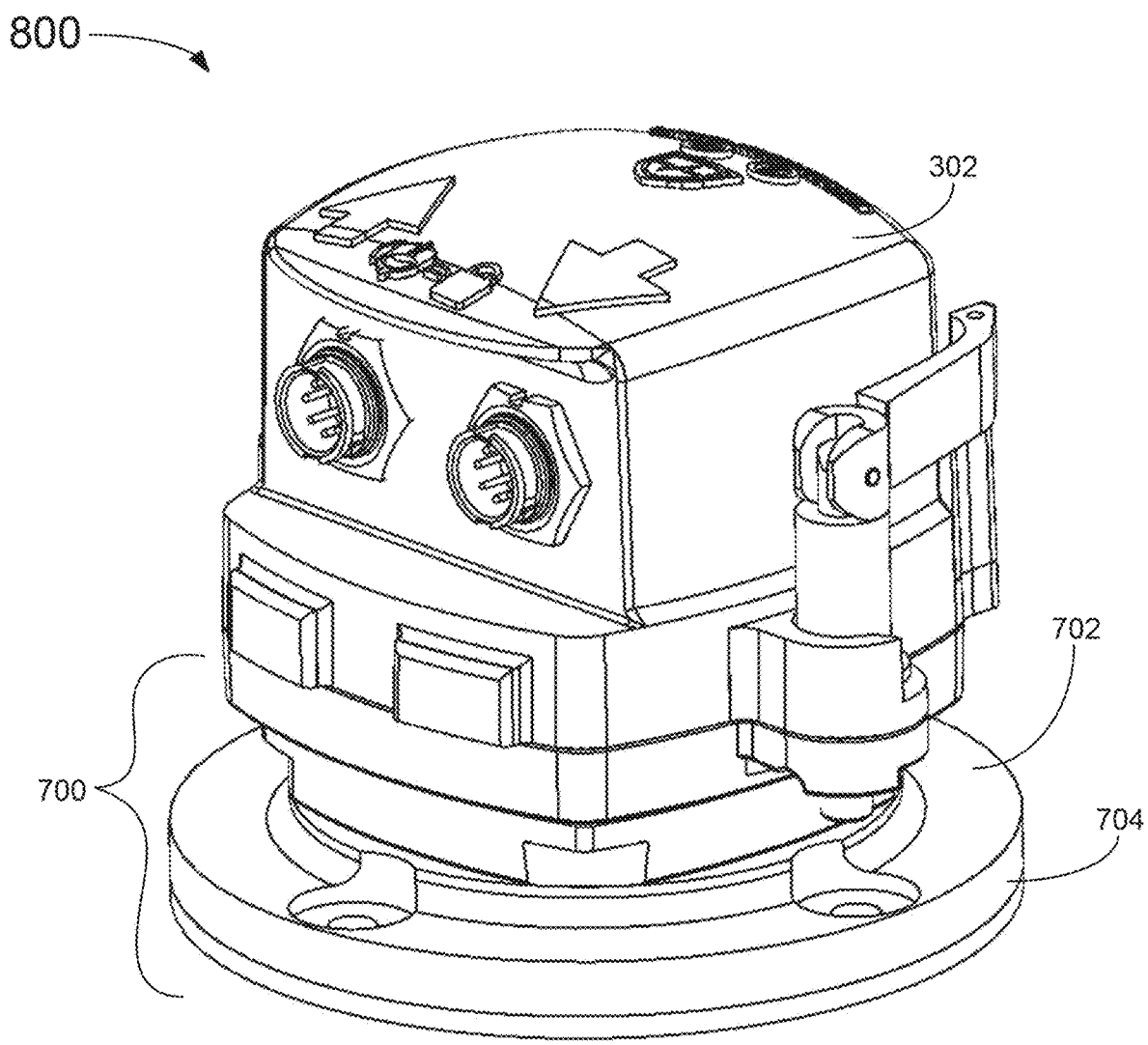
FIG. 8 illustrates a fluid sensor assembly including a rotatable base/flange assembly as shown in FIGS. 7A and 7B, in accordance with examples of the present disclosure.

FIG. 8 illustrates a fluid sensor assembly 800 similar to fluid sensor assembly 300 as described above. Cap 302 as described above can be positioned onto the base/flange assembly 700 and locked into position on base 702 as described above. However, it should be noted that fluid sensor assembly 800 is shown in FIG. 8 with cap 302 by way of example only. In other examples, the fluid sensor assembly 800 can include a cap that does not include the articulating levers as described herein. For example, the fluid sensor assembly 800 can include a cap that is screwed, bolted, or otherwise similarly attached to the base/flange assembly 700.

As described herein, the fluid sensor assembly 800 can be configured to mount on an external fuel container such as a fuel tanker trailer and, as such, can be designed to be exposed to harsh conditions such as rain, snow, wind, sun, heat, and other types of weather. In addition, the components of the fluid sensor assembly 800 can be designed to withstand potential corrosion caused by the fluid in the container as well as any fumes or vapors that the fluid gives off. For example, if the fluid is gasoline, the components of the fluid sensor assembly 800 can be manufactured from materials that can withstand exposure to the fluid. In certain implementations, the base 702 and the flange 704, and the components contained therein except as stated otherwise above, can be manufactured from a non-corrosive metal such as stainless-steel or another similar metal.

Figure 9:
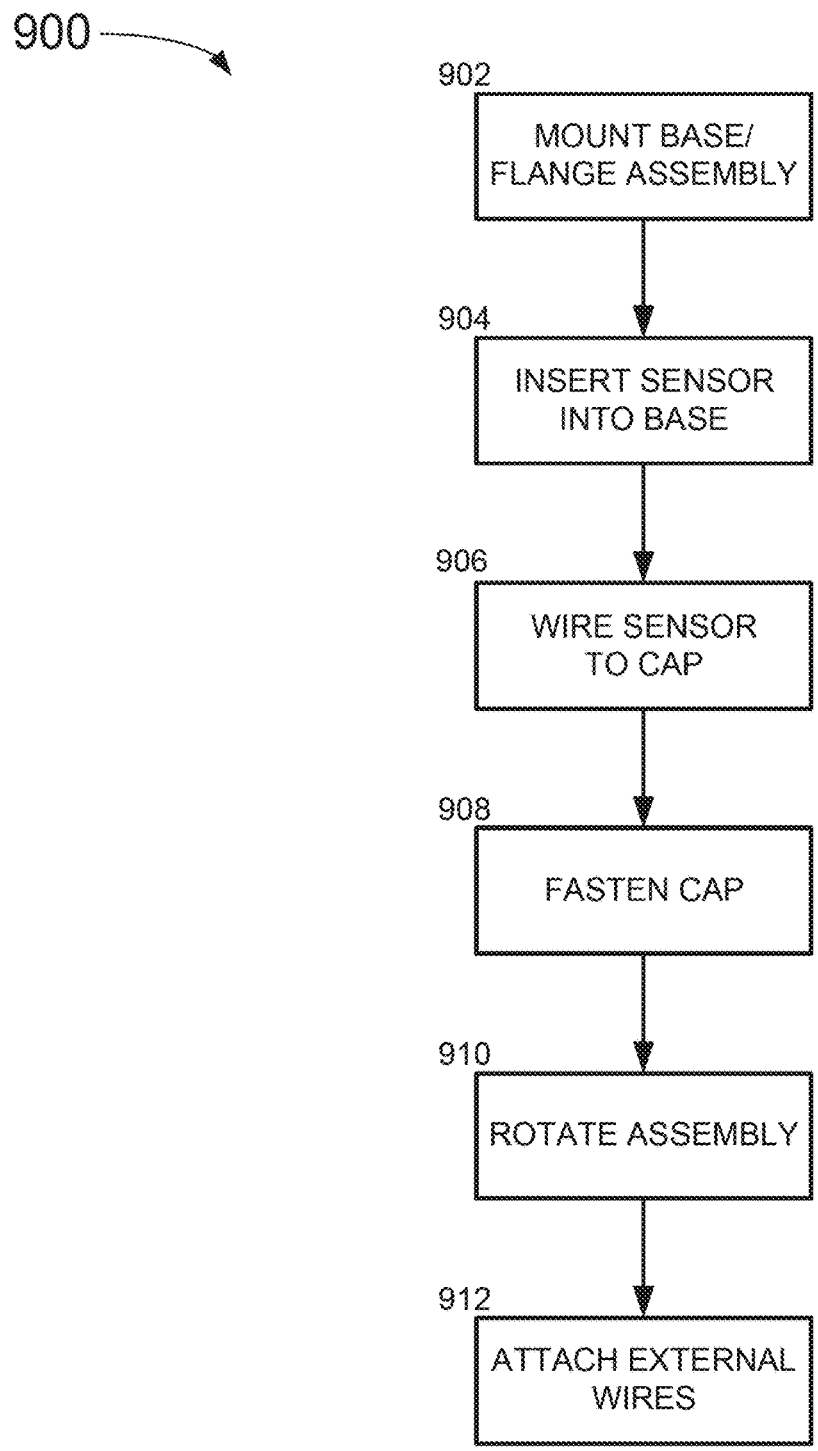
FIG. 9 illustrates a flow diagram depicting a process for mounting and assembling a fluid sensor assembly such as that illustrated in FIG. 8, in accordance with examples of the present disclosure.

FIG. 9 illustrates a sample process 900 for mounting and assembling a fluid sensor assembly (e.g., fluid sensor assembly 800 including a rotatable base/flange assembly) as described above. The process 900 can include initially mounting 902 the base/flange assembly to a fluid container such as a fluid compartment in a tanker trailer. Mounting 902 the base/flange assembly can include cutting a hole into the container or simply mounting the flange around a hole already cut or otherwise inserted into the container.

Process 900 can further include inserting 904 and securing the fluid sensor or probe into the base. As noted above, a fluid sensor base can include a mounting bracket configured to secure the fluid sensor as well as a sensor lock for tightening the sensor into the mounting bracket. The fluid sensor can be wired 906 to the cap. As noted above, the sensor can include a modular connector configured to attach to a mating modular connector on the cap. The cap can then be fastened 908 to the base/flange assembly. For example, if the cap includes articulating levers as described herein, the cap can be fastened 908 using the process as illustrated in FIGS. 5A-5C.

Process 900 can further include rotating 910 the fluid sensor assembly into a position where attaching the wires to the connectors on the cap is easiest or most convenient. The external wires can be attached 912 to the cap and process 900 is complete.

It should be noted that the process 900 as shown in FIG. 9 is provided by way of example only. In actual implementation, several of the process steps can be combined and/or performed in an alternate order. Similarly, additional process steps can be included. For example, in certain implementations, process 900 can further include locking the base/flange assembly into position following rotating 910 the assembly.

Dual-Sensor Assemblies

In some fuel filling environments such as a tank-to-tank filling environment with less sophisticated pumping equipment common, for example, in an airport where aviation fuel is pumped from a storage tank to tanker trucks, a two-probe fluid sensor assembly can be used. The first sensor extends further into the tank and provides an initial signal when the fuel hits a certain height. This signal indicates that the pump should begin to shut down the pumping operation. The second sensor provides an emergency shut off signal to the pump similar to the single fluid sensor examples as described above.

In order to conserve space, it is useful to include a two-sensor fluid sensor assembly into the space where a single fluid sensor assembly was previously mounted. However, two-sensor fluid sensor assemblies are generally bigger than single fluid sensor assemblies, thereby requiring fluid tank or storage container modification when being retrofit.

A two-sensor fluid probe assembly is described herein that provides for a smaller footprint when installed by using a similar sensor holder as those described above in regard to the single fluid sensor assemblies. However, the two-sensor fluid sensor assembly as described herein also provides for a semi- or fully-toolless installation that improves efficiency and ease of installation.

For example, a two-sensor fluid sensor assembly as described herein can include a probe holder configured to receive and secure two fluid sensor probes, a base configured to receive and secure the holder upon rotation of the holder into the base, and a spring positioned between the holder and the base, the spring positioned to exert a repelling force between the holder and the base to secure the holder to the base.

Figure 10:
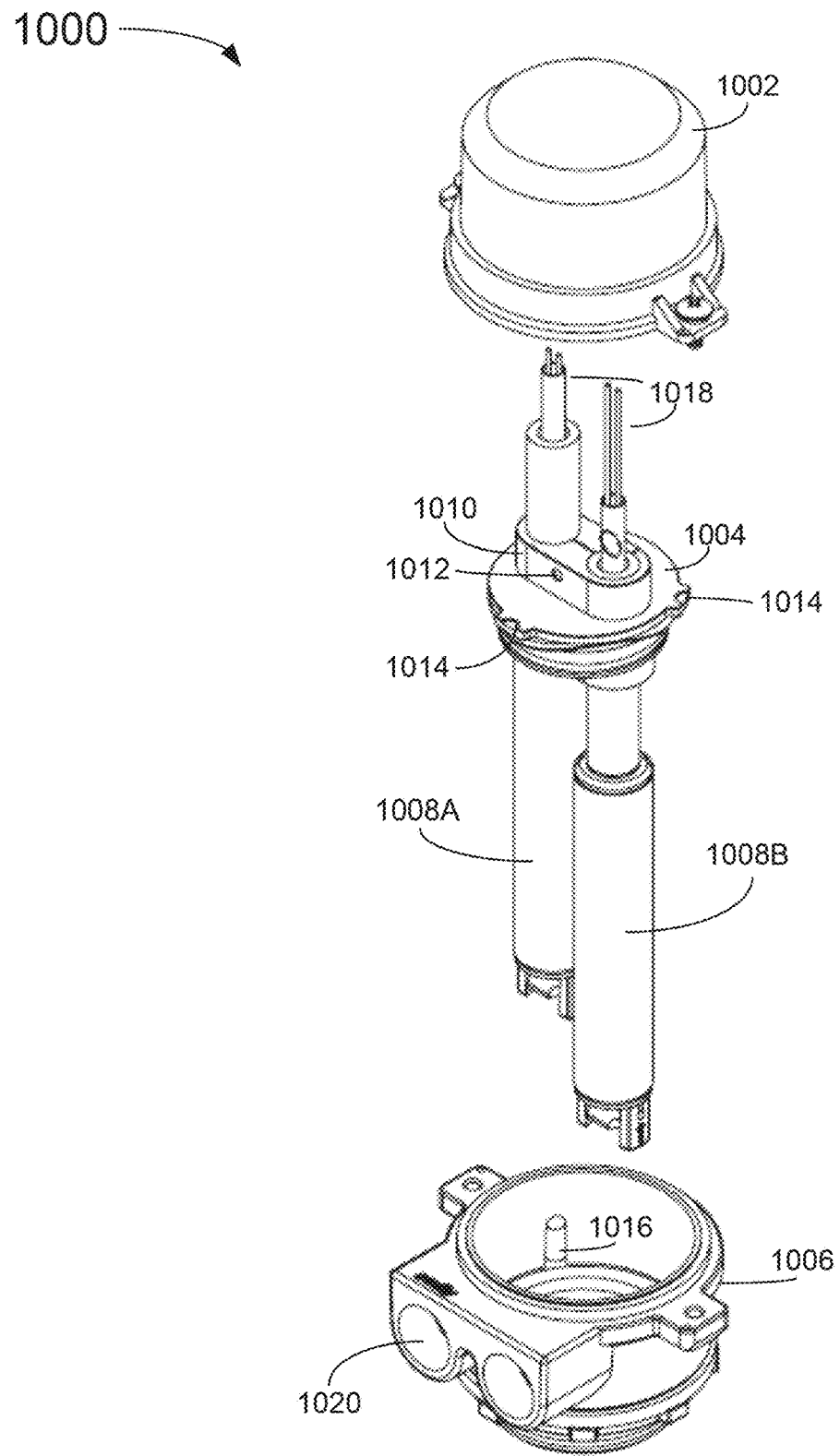
FIG. 10 depicts an illustration of a dual-sensor fluid sensor assembly, in accordance with examples of the present disclosure.

FIG. 10 illustrates a sample dual-sensor fluid sensor assembly 1000 as described herein. The assembly 1000 can include a cap 1002, a probe holder 1004, and a base 1006. As shown in FIG. 10, the cap 1002 can include two screws or other similar removable fasteners for removable affixing the cap to the base 1006. The base 1006 can be configured to mount to a flange such as flange 306 as described above, thereby requiring the same amount of space as the single fluid sensor assemblies as described above. For example, the base 1006 can be configured to thread into a flange to physically attach the base to the flange. Once attached to the flange, the probe holder can be inserted into the base 1006 and the cap can be affixed as described below.

As shown in FIG. 10, the assembly 1000 includes two fuel sensor probes 1008A and 1008B. In certain implementations, the two probes 1008A and 1008B are set to measure fuel levels at different heights. To continue the above example, probe 1008A can be set to extend further into a fuel storage container and provide an initial signal to begin shutting down the pump. Probe 1008B can be set to sit higher in the fuel storage container and to provide the emergency shut off signal.

In certain implementations, the difference in height between the two probes 1008A and 1008B can be about 1.5 inches. However, this height difference can be adjust based upon various factors such as the fill rate of the pump, the size of the fuel storage container, and the recommended fill height of the fuel storage container. In some examples, probes 1008A and 1008B can be different sizes. For example, probe 1008A can be a twelve-inch probe and probe 1008B can be a 7-inch probe.

As further shown in FIG. 10, the holder 1004 of assembly 1000 can include a probe mounting bracket 1010 configured to hold both of probes 1008A and 1008B in position. The mounting bracket 1010 can include a probe lock 1012 configured to apply pressure to the mounting bracket to hold the probes 1008A and 1008B in place during operation. In some examples, the probe lock 1012 can be a toolless fastener such as a thumb screw or a butterfly/wing nut. In other examples, the probe lock can be a tooled fastener such as a hex nut, a bolt, or a screw that requires a driver for tightening. In certain implementations, the probe lock 1012 can be configured to secure both probes 1008A and 1008B simultaneous. In other examples, the probe lock 1012 can include two locking members configured to individually hold each of the probes 1008A and 1008, allowing for one probe to be securely tightened while the second probe can be loosened for adjustment.

Referring again to FIG. 10, the holder 1004 can also include a number of rotational locking members 1014. As shown in FIG. 10, each of the rotational locking members 1014 can be configured to extend from the holder 1004. The rotational locking members 1014 can be positioned and configured to lock the holder 1004 into the base 1006. For example, as shown in FIG. 10, the base 1006 can include a number of receiving detents 1016. Upon insertion of the holder 1004 into the base 1006, the holder can be rotated such that the rotational locking members 1014 engage the receiving detents 1016, thereby locking the holder into the base. Such an operation provides for a toolless insertion of the holder into the base.

As further shown in FIG. 10, each of probes 1008A and 1008B include wires 1018. Upon insertion of the holder 1004 into the base 1006, the wires 1018 can be directed through one or more wire connectors 1020 for exterior connection.

Figure 11:
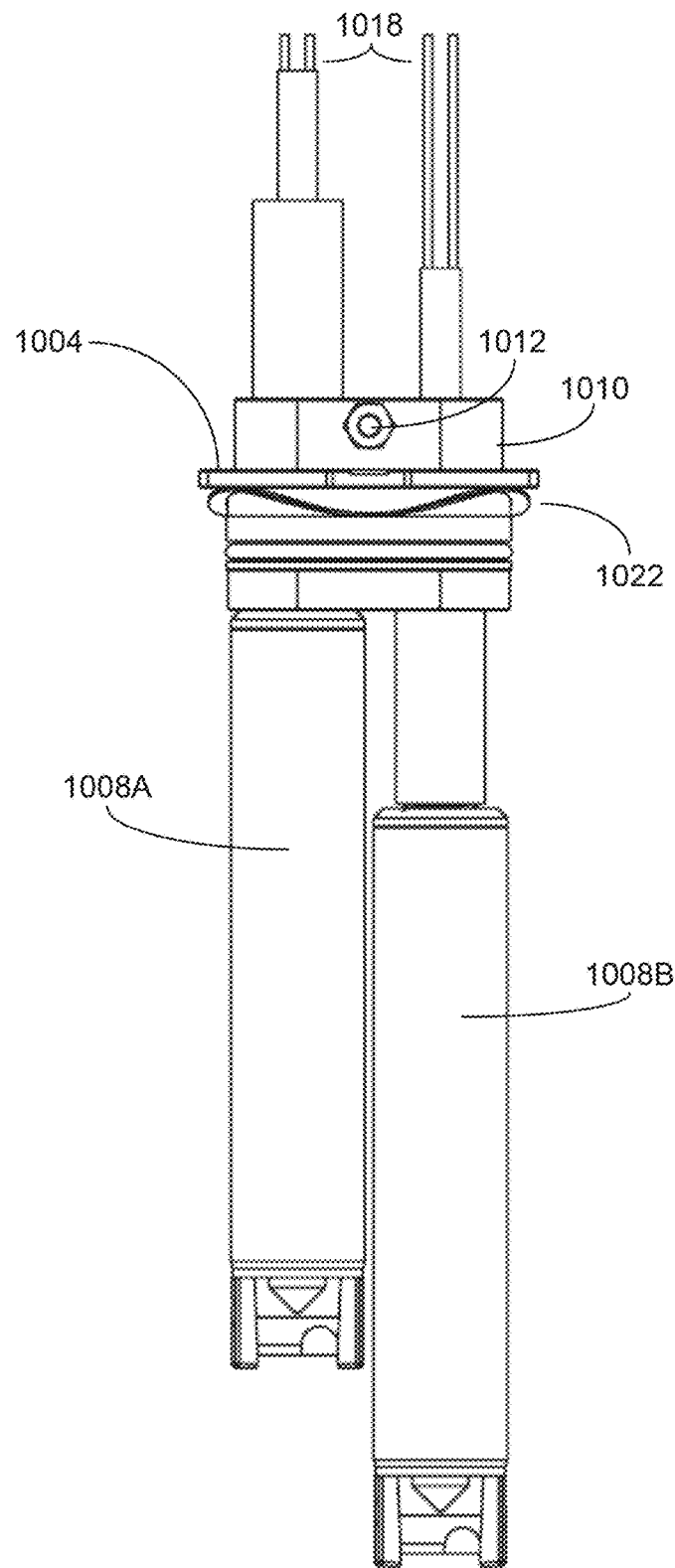
FIG. 11 illustrates a front view of a holder component including two sensor probes, in accordance with examples of the present disclosure.

FIG. 11 provides an additional view of the holder 1004 and the probes 1008A and 1008B. As shown in FIG. 11, the holder can also include a wave or disk spring 1022. In certain implementations, the disk spring can be manufactured from a metal such as stainless steel or carbon steel. Upon insertion of the holder 1004 into the base 1006, the disk spring is positioned and configured to push back against the holder, thereby creating a repelling force between the holder and the base. This repelling force acts to secure the rotational locking members 1014 into the receiving detents 1016. To remove the holder 1004 from the base 1006, an opposite force to the repelling force can be applied to the holder to offset the disk spring 1022 and release the rotational locking members from the receiving detents 1016, thereby allowing for rotation and removal of the holder from the base. In some implementations, the disk spring 1022 can be configured to exert about 20 pounds of pressure as the repelling force as described herein. In some examples, the disk spring 1022 can be configured to exert about 25-50 pounds of pressure. In other examples, the disk spring can be configured to exert about 10-30 pounds of pressure.

The specific design of the components of assembly 1000 as shown in FIGS. 10 and 11 provides for improved installation and servicing of a dual-sensor fluid sensor assembly (or, for example, any configuration of sensor assembly fitting through the sensor holder as described herein, for example, a one-sensor or a three-sensor assembly) as described herein. For example, upon removal of the cap 1002 (for example, by loosening the two screws shown on opposites sides of cap 1002 in FIG. 10), a technician can remove the holder 1004 on the fluid tank without tools by simply depressing the holder, thereby opposing the repelling force exerted by the disk spring 1022 and rotating the holder. After rotation, the technician can remove the holder 1004 from the base 1006 and return to ground level for inspection of the probes 1008A and 1008B. If necessary, replacement of one or both of the probes 1008A and 1008B is simplified to merely loosening the probe lock 1012 and removing one or both of the probes from the mounting bracket 1010. In certain implementations, if the probe lock 1012 is a toolless fastener such as a thumbscrew, the technician does not need any tools to remove the holder 1004 from the base 1006 and replace one or both of probes 1008A and 1008B.

It should be noted that cap 1002 as shown in FIG. 10 is provided with screws for attaching to base 1006 by way of example only. In certain implementations, a modified version of cap 302 including the articulating levers as described above can be used with the dual-sensor fluid sensor assembly 1000.

As described herein, the assembly 1000 can be configured to mount on an external fuel container such as a fuel tanker trailer and, as such, can be designed to be exposed to harsh conditions such as rain, snow, wind, sun, heat, and other types of weather. In addition, the components of the assembly 1000 can be designed to withstand potential corrosion caused by the fluid in the container as well as any fumes or vapors that the fluid gives off. For example, if the fluid is gasoline, the components of the fluid sensor assembly 1000 can be manufactured from materials that can withstand exposure to the fluid. In certain implementations, the holder 1004 and the base 1006, and the components contained therein except as stated otherwise above, can be manufactured from a non-corrosive metal such as stainless-steel or another similar metal. The cap 1002 can be manufactured from a lighter material such as a high-density polyethylene or another similar plastic.

Figure 12:
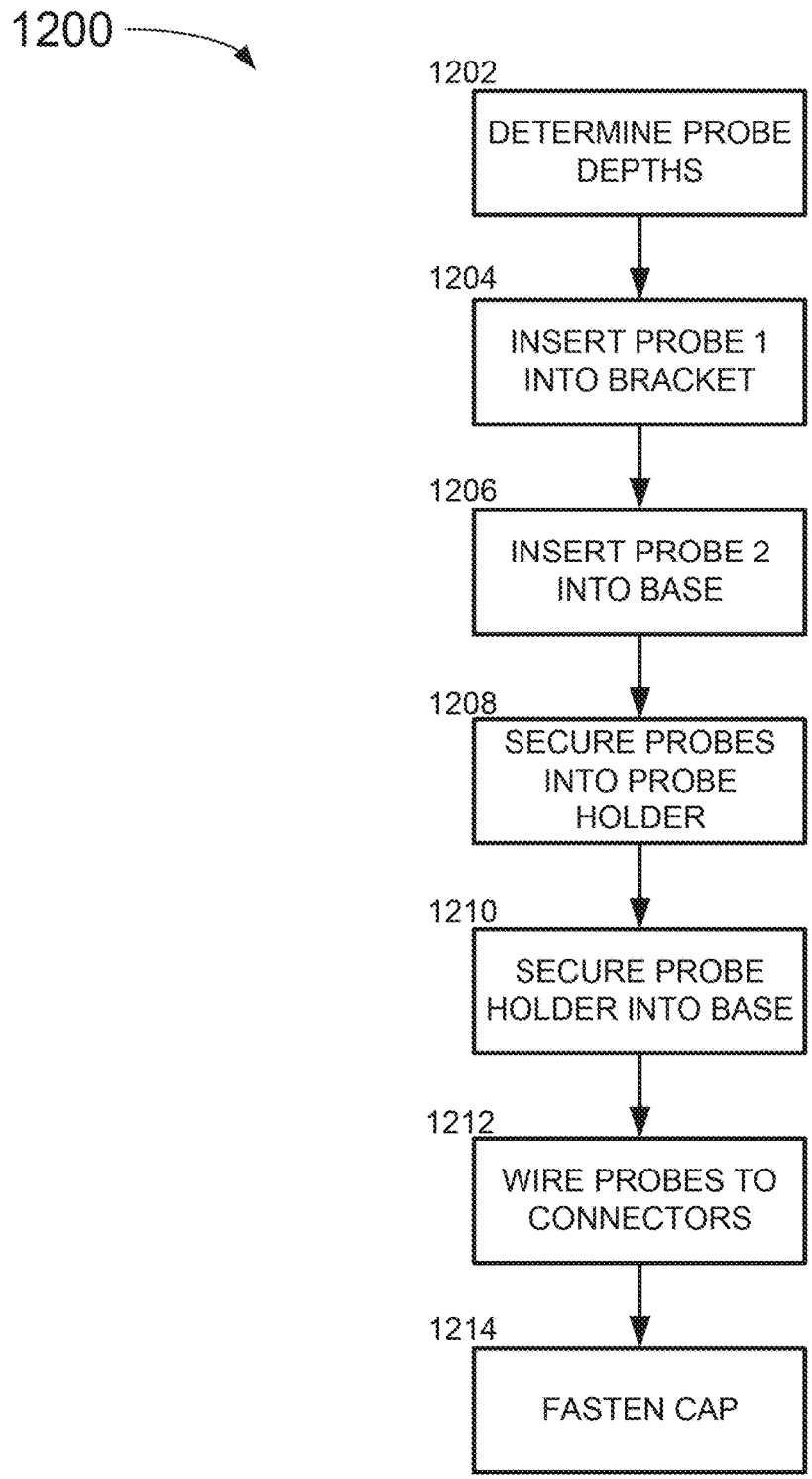
FIG. 12 illustrates a flow diagram depicting a process for mounting and assembling a dual-sensor fluid sensor assembly, in accordance with examples of the present disclosure.

FIG. 12 illustrates a sample process 1200 for mounting and assembling a dual-sensor fluid sensor assembly (e.g., assembly 1000) as described above. The process 1200 can include determining 1202 a depth for each of the probes being inserted into the assembly. For example, as noted above, determining the probe depth can be based upon various factors such as pump fill rate, fuel storage tank size, and recommended fuel height in the tank. Based upon this information, a depth for each of the fuel probes can be determined 1202. For example, probe one can be inserted to a depth of 7.5 inches and probe two can be inserted to a depth of 6.0 inches.

Process 1200 can further include inserting 1204 probe 1 into the mounting bracket, inserting 1206 probe two into the mounting bracket, and securing 1208 both of the probes into the probe holder. For example, securing 1208 the probes can include tightening the probe lock on the mounting bracket.

Once the probes are secured 1208 into the probe holder, the holder can be secured 1210 to the base. As noted above, to secure 1210 the holder to the base, the holder can be inserted into the base and pushed down into the base, thereby opposing any pressure exerted on the holder by the disk spring (e.g., disk spring 1022) now positioned between the holder and base. The holder can be rotated until the rotational locking members (e.g., rotational locking members 1014) engage the receiving detents (e.g., receiving detents 1016). Upon release of the holder, the disk spring will exert a repelling force on the base and the holder, thereby locking the rotational locking members into the receiving detents.

Process 1200 can further include wiring 1212 the individual probes to connectors in the base (e.g., connectors 1020) or directly to a wiring harness or other similar external wires. Process 1200 further includes fastening 1214 the cap to the base, thereby completing process 1200.

It should be noted that process 1200 as shown in FIG. 12 is provided by way of example only. In actual implementation, several of the process steps can be combined and/or performed in an alternate order. Similarly, additional process steps can be included. For example, in certain implementations, process 1200 can further include mounting a base/flange assembly onto the fuel storage container. In other examples, the process 1200 can include a removal of the holder from the base by, as noted above, depressing the holder into the base to offset the repelling force and rotating the holder to remove form the base.

Figure 1:
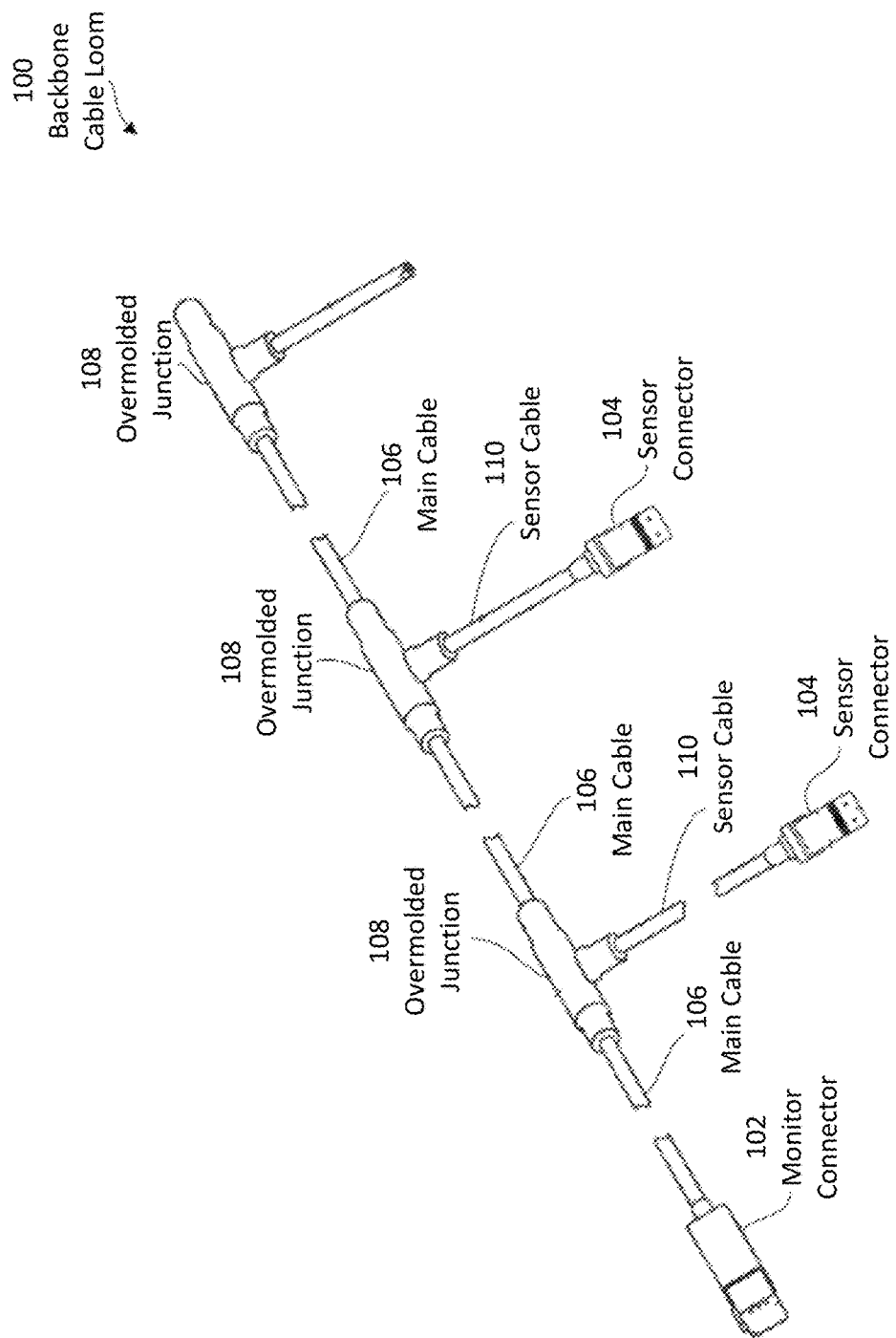
FIG. 1 illustrates a conventional backbone cable loom.

As noted above, FIG. 1 illustrates an example cable loom 100 including overmolded junctions to protect connecting wires. However, when using a dual sensor assembly as described in FIGS. 10-12, it may not be feasible or convenient to use pre-manufactured cables as is shown in FIG. 1. Rather, each fluid sensor can be wired individually to a central control unit, the wires being run in a protective sheathing such as a conduit or a flexible sheathing to provide protection from the elements as well as the any spilled fluid being stored in the container that the dual-sensor fluid sensor assembly is mounted to.

Figure 13:
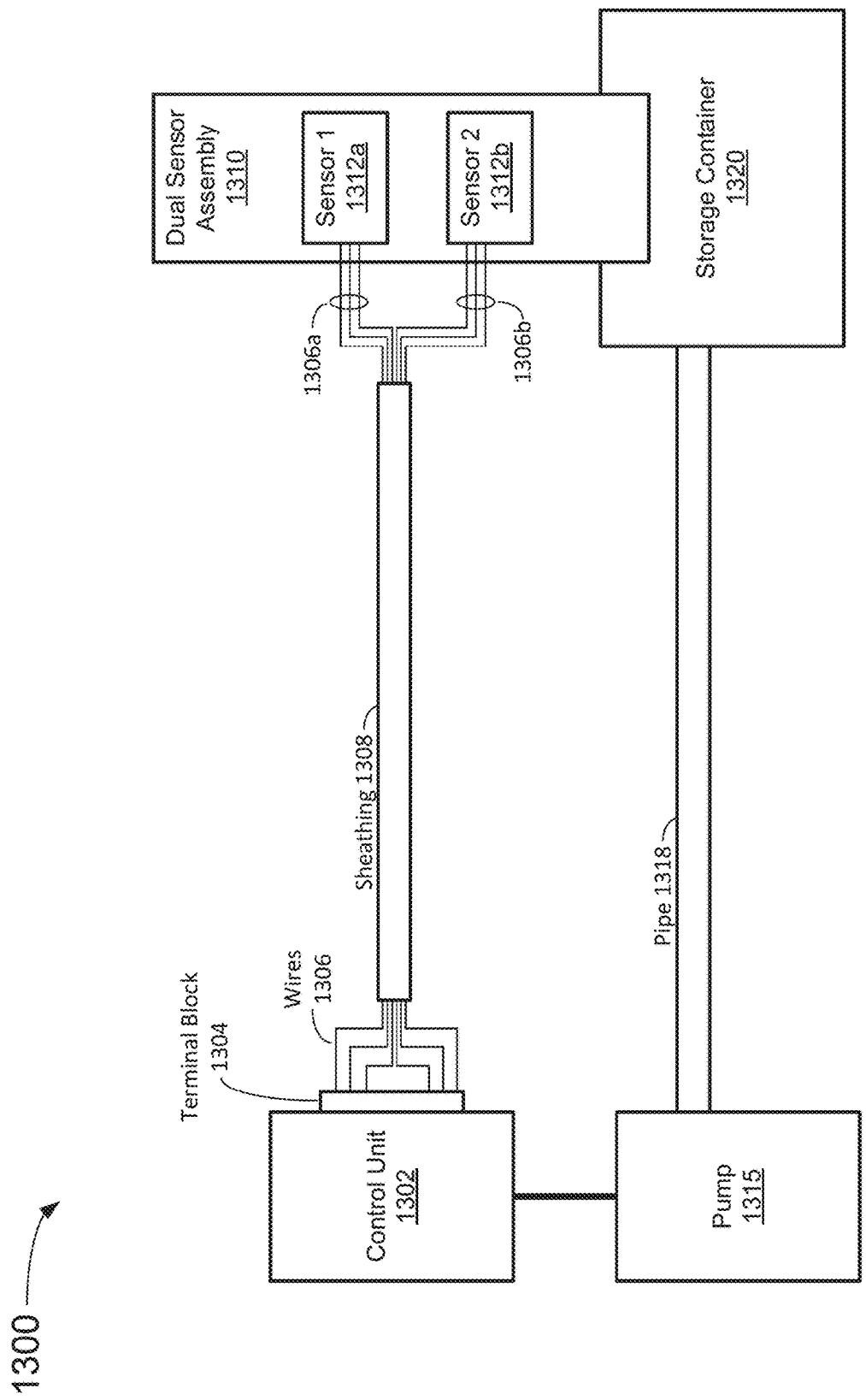
FIG. 13 illustrates a sample wiring diagram for connecting a control device and multiple fluid sensors in a dual-sensor fluid sensor assembly, in accordance with examples of the present disclosure.

For example, FIG. 13 illustrates a sample wiring system 1300 that includes one example of wiring for a dual sensor fluid sensor assembly as described herein. As shown in FIG. 13, the system 1300 can include a control unit 1302 that can be configured to provide control instructions to a pump 1315. The pump can be configured to pump a fluid such as gasoline or another similar fluid into storage container 1320 via pipe 1318. As further shown in FIG. 13, the storage container 1320 can include a dual-sensor fluid sensor assembly 1310 as described herein.

The control unit 1302 can include one or more terminal blocks 1304 that are positioned and configured to receive one or more wires 1306. As shown in FIG. 13, the wires 1306 include multiple wires connected to various portions of the terminal block 1304. The terminal block 1304 can be configured to provide power, ground, control signals, and other similar electrical signals from the control unit 1302 to the wires 1306.

As further shown in FIG. 13, the wires 1306 are run through a protective sheathing 1308 to the dual-sensor fluid sensor assembly 1310. A portion 1306a of the wires 1306 are directed to and physically connected to a first sensor 1312a. For example, a power wire, a ground wire, and one or more control wires can be operably connected to the first sensor 1312a, thereby operably coupling the first sensor with the control unit 1302. Similarly, a second portion 1306b of the wires 1306 are directed to and physically connected to a second sensor 1312b. For example, a power wire, ground wire, and one or more control wires can be operably connected to the second sensor 1312b, thereby operably coupling the second sensor with the control unit 1302.

For example, wires 1306a can be directed through a first wire connector (e.g., one of wire connectors 1020 as described above) on the dual-sensor fluid sensor assembly 1310 and operably connected to wires attached to the first sensor 1312a (e.g., one of wires 1018 as described above). Similarly, wires 1306b can be directed through a second wire connector on the dual-sensor fluid sensor assembly 1310 and operably connected to wires attached to the second sensor 1312b. Once connected, sensors 1312a and 1312b can receive power from and communicate fluid level information with the control unit 1302. Based upon information from the sensors 1312a and 1312b, the control unit can provide updated control instructions to the pump 1315.

It should be noted that the wiring system 1300 as shown in FIG. 13 is provided by way of example only, and certain aspects of the diagram are included for illustrative purposes only. For example, wires 1306 is shown as having six wires by way of example only. In actual implementation, the number of wires included in wires 1306 can vary based upon the number of sensors being connected to the control unit 1302 as well as the individual wiring requirements of each of the sensors. Similarly, in certain implementations, the sensors 1312a and 1312b could share a common wire of wires 1306. For example, each of sensors 1312a and 1312b could have a common ground or power wire.

It should also be noted that in an actual installation, the sheathing 1308 would be arranged such that no portion of the wires 1306 are exposed. However, a portion of the wires 1036 are shown as exposed in FIG. 13 by way of example only.

The examples of the methods and apparatuses discussed herein are not limited in application to the details of construction and the arrangement of components set forth in the following description or illustrated in the accompanying drawings. The methods and apparatuses are capable of implementation in other examples and of being practiced or of being carried out in various ways. Examples of specific implementations are provided herein for illustrative purposes only and are not intended to be limiting. In particular, acts, elements and features discussed in connection with any one or more examples are not intended to be excluded from a similar role in any other examples.

Also, the phraseology and terminology used herein is for the purpose of description and should not be regarded as limiting. Any references to examples or elements or acts of the systems and methods herein referred to in the singular may also embrace examples including a plurality of these elements, and any references in plural to any example or element or act herein may also embrace examples including only a single element. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Having thus described several aspects of at least one example of this disclosure, it is to be appreciated various alterations, modifications, and improvements will readily occur to those skilled in the art. Such alterations, modifications, and improvements are intended to be part of this disclosure and are intended to be within the scope of the disclosure. Accordingly, the foregoing description and drawings are by way of example only.

What is claimed is:

1. A fluid sensor assembly comprising:
   a flange configured to mount to a fluid container;
   a base configured to receive a fluid sensor, the base rotatably mounted to the flange and configured to rotate about the flange, the base forming a plurality of receiving apertures positioned about a perimeter of the base; and
   a cap configured to lock on the base and form a fluid-tight seal between the cap and the base, the cap comprising a plurality of articulating levers, each articulating lever comprising a latching feature configured to be inserted into one of the plurality of receiving apertures when the cap is fitted on the base and to lock the cap to the base upon actuation of the articulating levers.

2. The fluid sensor assembly of claim 1, further comprising a swivel seal positioned between the base and the flange when the base is mounted to the flange, the swivel seal configured to form a fluid seal between the base and the flange during rotation of the base about the flange.

3. The fluid sensor assembly of claim 1, further comprising a retaining ring configured to rotatably lock the base to the flange.

4. The fluid sensor assembly of claim 1, further comprising a locking mechanism configured to prevent rotation of the base about the flange.

5. The fluid sensor assembly of claim 1, wherein the cap further comprises one or more toolless wire connectors configured to provide an electrical connection to the fluid sensor.

6. The fluid sensors of claim 1, wherein each of the plurality of articulating levers is configured to rotate about a central axis to lock the cap to the base upon rotation of the articulating levers.

7. The fluid sensor assembly of claim 6, wherein each of the plurality of receiving apertures comprises a slot.

8. The fluid sensor assembly of claim 7, wherein each of the latching features comprises a pin extending from opposites sides of the articulating lever, the pin sized to fit into the slot when the cap is fitted to the base and to lock into the slot upon rotation of the articulating levers.

9. The fluid sensor assembly of claim 1, wherein the base is configured to rotate 360 degrees about the flange.

10. The fluid sensor assembly of claim 1, wherein the fluid sensor is a fluid overfill sensor.

11. A base assembly for use in a fluid sensor assembly, the base assembly comprising:
   a flange configured to mount to a fluid container;
   a base configured to receive a fluid sensor, the base rotatably mounted to the flange and configured to rotate about the flange, the base forming a plurality of receiving apertures positioned about a perimeter of the base, wherein the base is further configured to receive a cap, the cap comprising a plurality of articulating levels, each articulating lever comprising a latching feature configured to be inserted into one of the plurality of receiving apertures when the cap is fitted on the base and to lock the cap to the base upon actuation of the articulating levers;
   a swivel seal positioned between the base and the flange when the base is mounted to the flange, the swivel seal configured to form a fluid seal between the base and the flange during rotation of the base about the flange; and
   a retaining ring configured to rotatably lock the base to the flange.

12. The base assembly of claim 11, further comprising a locking mechanism configured to prevent rotation of the base about the flange.

13. The base assembly of claim 12, wherein the locking mechanism comprises a toolless locking mechanism and/or a tooled locking mechanism.

14. The base assembly of claim 11, wherein the base is configured to rotate 360 degrees about the flange.

15. The base assembly of claim 11, wherein the fluid sensor is a fluid overfill sensor.

16. A fluid sensor assembly comprising:
   a flange configured to mount to a fluid container;
   a base configured to receive a fluid sensor, the base rotatably mounted to the flange and configured to rotate about the flange, the base forming a plurality of receiving apertures positioned about a perimeter of the base;
   a swivel seal positioned between the base and the flange when the base is mounted to the flange, the swivel seal configured to form a fluid seal between the base and the flange during rotation of the base about the flange;
   a retaining ring configured to rotatably lock the base to the flange; and
   a cap configured to lock on the base and form a fluid-tight seal between the cap and the base, the cap comprising a plurality of articulating levers, each articulating lever comprising a latching feature configured to be inserted into one of the plurality of receiving apertures when the cap is fitted on the base and to lock the cap to the base upon actuation of the articulating levers.

17. The fluid sensor assembly of claim 16, further comprising a locking mechanism configured to prevent rotation of the base about the flange.

18. The fluid sensor assembly of claim 16, wherein the cap further comprises one or more toolless wire connectors configured to provide an electrical connection to the fluid sensor.

19. The fluid sensor assembly of claim 16, wherein the base is configured to rotate 360 degrees about the flange.

20. The fluid sensor assembly of claim 16, wherein the fluid sensor is a fluid overfill sensor.

* * * * *